US012652115B2

(12) United States Patent
Horn et al.

(10) Patent No.:  US 12,652,115 B2
(45) Date of Patent:       Jun. 9, 2026

(54) TECHNIQUES FOR POST-PROCESSING SIGNAL-TO-INTERFERENCE-PLUS-NOISE RATIO SIGNALING FOR COMMUNICATION ADAPTATION

(71) Applicant: QUALCOMM Incorporated, San Diego, CA (US)

(72) Inventors: Idan Michael Horn, Hod Hasharon (IL); David Yunusov, Holon (IL)

(73) Assignee: QUALCOMM Incorporated, San Diego, CA (US)

( * ) Notice: Subject to any disclaimer, the term of this patent is extended or adjusted under 35 U.S.C. 154(b) by 26 days.

(21) Appl. No.: 18/764,880

(22) Filed: Jul. 5, 2024

(65) Prior Publication Data

US 2026/0012272 A1     Jan. 8, 2026

(51) Int. Cl.
*H04B 17/336*       (2015.01)
*H04W 8/24*       (2009.01)

(52) U.S. Cl.
CPC ............ *H04B 17/336* (2015.01); *H04W 8/24* (2013.01)

(58) Field of Classification Search
CPC .................................. H04B 7/336; H04W 8/24
See application file for complete search history.

(56) References Cited

U.S. PATENT DOCUMENTS

| | | | | | |
|---|---|---|---|---|---|
| 7,835,432 | B2 * | 11/2010 | Tujkovic | ................ | H04B 17/26 |
| | | | | | 370/341 |
| 8,064,424 | B2 * | 11/2011 | Sambhwani | ............ | H04J 13/18 |
| | | | | | 370/320 |

| | | | | | |
|---|---|---|---|---|---|
| 8,223,826 | B2 * | 7/2012 | Tujkovic | .............. | H04B 17/345 |
| | | | | | 370/241 |
| 8,233,926 | B2 * | 7/2012 | Heath | .................. | H04B 7/0689 |
| | | | | | 455/501 |
| 8,385,435 | B2 * | 2/2013 | Garrett | ................. | H04B 17/345 |
| | | | | | 375/285 |
| 8,483,337 | B2 * | 7/2013 | Jones | ................ | H04L 25/03006 |
| | | | | | 375/267 |

(Continued)

FOREIGN PATENT DOCUMENTS

| | | | | | |
|---|---|---|---|---|---|
| BR | PI0617866 A2 * | 8/2011 | .......... | H04L 1/0687 |
| CN | 101960729 A * | 1/2011 | .......... | H04B 7/0639 |

(Continued)

OTHER PUBLICATIONS

Bielinski et al., Application of adaptive OFDM bit loading algorithm for high data rate through- metal communication, IEEE, May 2021 (Year: 2021).*

(Continued)

*Primary Examiner* — Berhanu Tadese
(74) *Attorney, Agent, or Firm* — Harrity & Harrity LLP/Qualcomm Incorporated

(57) ABSTRACT

Various aspects of the present disclosure generally relate to wireless communication. In some aspects, a first wireless communication device may transmit, to a second wireless communication device, a post-processing signal-to-interference-plus-noise ratio (PPSINR) message identifying the PPSINR value. The first wireless communication device may receive, from the second wireless communication device and based on transmitting the PPSINR message identifying the PPSINR value, a communication in accordance with the PPSINR value. Numerous other aspects are described.

20 Claims, 9 Drawing Sheets

(56) References Cited

U.S. PATENT DOCUMENTS

| | | | | |
|---|---|---|---|---|
| 8,811,516 | B2 * | 8/2014 | Koivisto | H04B 7/0639 |
| | | | | 375/267 |
| 8,855,046 | B2 * | 10/2014 | Jalloul | H04W 52/24 |
| | | | | 370/328 |
| 8,923,215 | B2 * | 12/2014 | Vermani | H04L 1/0025 |
| | | | | 370/329 |
| 9,184,810 | B2 * | 11/2015 | Quan | H04W 72/1221 |
| 9,484,990 | B2 * | 11/2016 | Heath | H04B 7/022 |
| 9,843,377 | B2 * | 12/2017 | Yeo | H04W 24/08 |
| 10,574,368 | B2 * | 2/2020 | Chang | H04B 17/309 |
| 10,602,496 | B2 * | 3/2020 | Davydov | H04L 1/0026 |
| 11,310,021 | B2 * | 4/2022 | Levitsky | H04B 17/336 |
| 11,483,112 | B2 * | 10/2022 | Levitsky | H04W 72/0446 |
| 11,489,568 | B2 * | 11/2022 | Kuchi | H04B 7/0626 |
| 11,626,914 | B2 * | 4/2023 | Levitsky | H04B 17/336 |
| | | | | 370/329 |
| 11,632,189 | B1 * | 4/2023 | Svantesson | H04L 5/0085 |
| | | | | 370/329 |
| 11,764,907 | B2 * | 9/2023 | Kotaba | H04L 1/1887 |
| | | | | 370/329 |
| 11,863,314 | B1 * | 1/2024 | Svantesson | H04L 1/0003 |
| 11,936,581 | B2 * | 3/2024 | Levitsky | H04W 72/0446 |
| 11,949,475 | B2 * | 4/2024 | Kuchi | H04B 7/0639 |
| 12,101,270 | B2 * | 9/2024 | Kuchi | H04L 5/0094 |
| 12,143,178 | B2 * | 11/2024 | Kuchi | H04B 7/0452 |
| 12,237,952 | B1 * | 2/2025 | Paz | H04L 25/03993 |
| 12,278,718 | B2 * | 4/2025 | Yunusov | H04L 25/03165 |
| 12,556,246 | B2 * | 2/2026 | Huang | H04B 7/0469 |
| 2007/0019535 | A1 * | 1/2007 | Sambhwani | H04J 13/18 |
| | | | | 370/342 |
| 2007/0165738 | A1 * | 7/2007 | Barriac | H04L 1/0687 |
| | | | | 375/267 |
| 2007/0183522 | A1 * | 8/2007 | Garrett | H04B 17/345 |
| | | | | 375/260 |
| 2007/0248155 | A1 * | 10/2007 | Tujkovic | H04B 17/345 |
| | | | | 375/227 |
| 2009/0291699 | A1 * | 11/2009 | Heath | H04B 7/0689 |
| | | | | 455/501 |
| 2011/0177838 | A1 * | 7/2011 | Olszewski | H04W 52/241 |
| | | | | 455/522 |
| 2012/0250743 | A1 * | 10/2012 | Heath | H04L 1/0015 |
| | | | | 375/219 |
| 2013/0136166 | A1 * | 5/2013 | Garrett | H04B 17/345 |
| | | | | 375/227 |
| 2014/0369215 | A1 * | 12/2014 | Yeo | H04W 24/08 |
| | | | | 370/252 |
| 2020/0007246 | A1 * | 1/2020 | Chang | H04B 17/309 |
| 2021/0359800 | A1 * | 11/2021 | Levitsky | H04L 5/0007 |
| 2021/0359806 | A1 * | 11/2021 | Levitsky | H04L 5/0048 |
| 2021/0359828 | A1 * | 11/2021 | Levitsky | H04L 25/0222 |
| 2021/0376898 | A1 * | 12/2021 | Levitsky | H04W 24/10 |
| 2022/0225127 | A1 * | 7/2022 | Imran | H04W 24/02 |
| 2023/0032326 | A1 * | 2/2023 | Levitsky | H04L 5/0048 |
| 2023/0155864 | A1 * | 5/2023 | Abdoli | H04L 25/0204 |
| | | | | 370/329 |
| 2023/0247646 | A1 * | 8/2023 | Levitsky | H04L 5/0057 |
| | | | | 370/329 |
| 2023/0344600 | A1 * | 10/2023 | Levitsky | H04B 7/0626 |
| 2024/0072861 | A1 * | 2/2024 | Lu | H04L 25/0224 |
| 2024/0080162 | A1 * | 3/2024 | Demir | H04L 5/0051 |
| 2024/0421867 | A1 * | 12/2024 | Huang | H04B 7/0469 |
| 2025/0047342 | A1 * | 2/2025 | Huang | H04B 7/0413 |
| 2025/0071003 | A1 * | 2/2025 | Paz | H04L 25/0224 |
| 2025/0080384 | A1 * | 3/2025 | Barbu | H04B 1/10 |
| 2025/0081168 | A1 * | 3/2025 | Barbu | H04W 72/231 |
| 2025/0088393 | A1 * | 3/2025 | Yunusov | H04L 25/0224 |
| 2025/0125922 | A1 * | 4/2025 | Kuchi | H04L 5/0023 |
| 2025/0132794 | A1 * | 4/2025 | Kuchi | H04B 7/0473 |
| 2025/0141503 | A1 * | 5/2025 | To | H04B 7/0465 |
| 2025/0275008 | A1 * | 8/2025 | Oh | H04W 24/02 |
| 2026/0012272 | A1 * | 1/2026 | Horn | H04B 1/0475 |

FOREIGN PATENT DOCUMENTS

| | | | | |
|---|---|---|---|---|
| CN | 102640431 | A * | 8/2012 | H04B 7/0639 |
| CN | 102651912 | A * | 8/2012 | H04W 72/23 |
| CN | 103548309 | A * | 1/2014 | H04J 11/00 |
| CN | 103825641 | A * | 5/2014 | |
| CN | 102651912 | B * | 2/2015 | H04W 72/23 |
| CN | 105519030 | A * | 4/2016 | H04L 1/0693 |
| CN | 106717100 | A * | 5/2017 | H04W 74/0808 |
| CN | 104221303 | B * | 6/2018 | H04B 7/0452 |
| CN | 106717100 | B * | 7/2020 | H04W 72/121 |
| CN | 113287275 | A * | 8/2021 | H04W 52/20 |
| CN | 115843454 | A * | 3/2023 | H04L 5/0053 |
| CN | 115883014 | A * | 3/2023 | H04L 1/0035 |
| CN | 116941190 | A * | 10/2023 | H04B 7/0617 |
| CN | 115883014 | B * | 3/2024 | H04L 1/002 |
| CN | 117957787 | A * | 4/2024 | H04W 72/0453 |
| CN | 118285070 | A * | 7/2024 | H04B 7/0469 |
| CN | 113287275 | B * | 9/2024 | H04L 5/0005 |
| EP | 2959621 | B1 * | 8/2018 | H04L 1/0693 |
| EP | 4152639 | A1 * | 3/2023 | H04L 25/0204 |
| EP | 4336756 | A1 * | 3/2024 | H04L 1/0026 |
| EP | 4302419 | B1 * | 1/2025 | H04L 25/0224 |
| GB | 2633051 | A * | 3/2025 | H04L 67/12 |
| KR | 20080059672 | A * | 6/2008 | H04L 1/0687 |
| KR | 20140145873 | A * | 12/2014 | H04B 7/0669 |
| KR | 20150006847 | A * | 1/2015 | H04B 7/0452 |
| KR | 20150077248 | A * | 7/2015 | H04L 1/0009 |
| KR | 20240115134 | A * | 7/2024 | H04L 25/03299 |
| RU | 2388142 | C2 * | 4/2010 | H04B 7/0417 |
| RU | 2414074 | C2 * | 3/2011 | H04J 13/0048 |
| TW | 201136416 | A * | 10/2011 | H04L 1/0025 |
| WO | WO-2007117468 | A2 * | 10/2007 | H04L 5/023 |
| WO | WO-2010005988 | A2 * | 1/2010 | H04W 52/42 |
| WO | WO-2012153352 | A2 * | 11/2012 | H04W 72/542 |
| WO | WO-2015165515 | A1 * | 11/2015 | H04L 1/0693 |
| WO | WO-2017023230 | A1 * | 2/2017 | H04B 7/0626 |
| WO | WO-2021011131 | A1 * | 1/2021 | G06N 7/01 |
| WO | WO-2022040842 | A1 * | 3/2022 | H04L 5/0051 |
| WO | WO-2022186741 | A1 * | 9/2022 | H04L 25/0212 |
| WO | WO-2023046462 | A1 * | 3/2023 | H04B 7/0469 |
| WO | WO-2023057131 | A1 * | 4/2023 | H04B 7/0413 |
| WO | WO-2013081430 | A1 * | 6/2023 | H04L 1/0003 |
| WO | WO-2025049139 | A2 * | 3/2025 | H04L 25/03993 |
| WO | WO-2025103568 | A1 * | 5/2025 | H04B 7/0417 |
| WO | WO-2025165274 | A1 * | 8/2025 | H04L 1/0026 |
| WO | WO-2026010703 | A1 * | 1/2026 | H04B 1/0475 |

OTHER PUBLICATIONS

International Search Report and Written Opinion PCT/US2025/032870 ISA/EPO Aug. 29, 2025.

* cited by examiner

600

610 Transmit a PPSINR message identifying a PPSINR value

620 Receive, based on transmitting the PPSINR message identifying the PPSINR value, a communication in accordance with the PPSINR value

700

710    Receive a PPSINR message identifying a PPSINR value

720    Transmit, based on the reception of the PPSINR message identifying the PPSINR value, a communication in accordance with the PPSINR value

TECHNIQUES FOR POST-PROCESSING SIGNAL-TO-INTERFERENCE-PLUS-NOISE RATIO SIGNALING FOR COMMUNICATION ADAPTATION

FIELD OF THE DISCLOSURE

Aspects of the present disclosure generally relate to wireless communication and specifically relate to techniques, apparatuses, and methods for post-processing signal-to-interference-plus-noise ratio (PPSINR) signaling for communication adaptation.

DESCRIPTION OF RELATED ART

Wireless communication systems are widely deployed to provide various services that may include carrying voice, text, messaging, video, data, and/or other traffic. The services may include unicast, multicast, and/or broadcast services, among other examples. Typical wireless communication systems may employ multiple-access radio access technologies (RATs) capable of supporting communication with multiple users by sharing available system resources (for example, time domain resources, frequency domain resources, spatial domain resources, and/or device transmit power, among other examples). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple-access RATs have been adopted in various telecommunication standards to provide common protocols that enable different wireless communication devices to communicate on a municipal, national, regional, or global level. An example telecommunication standard is New Radio (NR). NR, which may also be referred to as 5G, is part of a continuous mobile broadband evolution promulgated by the Third Generation Partnership Project (3GPP). NR (and other mobile broadband evolutions beyond NR) may be designed to better support Internet of things (IoT) and reduced capability device deployments, industrial connectivity, millimeter wave (mmWave) expansion, licensed and unlicensed spectrum access, non-terrestrial network (NTN) deployment, sidelink and other device-to-device direct communication technologies (for example, cellular vehicle-to-everything (CV2X) communication), massive multiple-input multiple-output (MIMO), disaggregated network architectures and network topology expansions, multiple-subscriber implementations, high-precision positioning, and/or radio frequency (RF) sensing, among other examples. As the demand for mobile broadband access continues to increase, further improvements in NR may be implemented, and other radio access technologies such as 6G may be introduced, to further advance mobile broadband evolution.

SUMMARY

Some aspects described herein relate to a method of wireless communication performed by a first wireless communication device. The method may include transmitting, to a second wireless communication device, a post-processing signal-to-interference-plus-noise ratio (PPSINR) message identifying a PPSINR value. The method may include receiving, from the second wireless communication device and based on transmitting the PPSINR message identifying the PPSINR value, a communication in accordance with the PPSINR value.

Some aspects described herein relate to a method of wireless communication performed by a second wireless communication device. The method may include receiving, from a first wireless communication device, a PPSINR message identifying a PPSINR value. The method may include transmitting, to the first wireless communication device and based on the reception of the PPSINR message identifying the PPSINR value, a communication in accordance with the PPSINR value.

Some aspects described herein relate to a non-transitory computer-readable medium that stores a set of instructions for wireless communication by a first wireless communication device. The set of instructions, when executed by one or more processors of the first wireless communication device, may cause the first wireless communication device to transmit, to a second wireless communication device, a post-PPSINR message identifying a PPSINR value. The set of instructions, when executed by one or more processors of the first wireless communication device, may cause the first wireless communication device to receive, from the second wireless communication device and based on transmitting the PPSINR message identifying the PPSINR value, a communication in accordance with the PPSINR value.

Some aspects described herein relate to a non-transitory computer-readable medium that stores a set of instructions for wireless communication by a second wireless communication device. The set of instructions, when executed by one or more processors of the second wireless communication device, may cause the second wireless communication device to receive, from a first wireless communication device, a PPSINR message identifying a PPSINR value. The set of instructions, when executed by one or more processors of the second wireless communication device, may cause the second wireless communication device to transmit, to the first wireless communication device and based on the reception of the PPSINR message identifying the PPSINR value, a communication in accordance with the PPSINR value.

Some aspects described herein relate to a first wireless communication device for wireless communication. The first wireless communication device may include one or more memories and one or more processors coupled to the one or more memories. The one or more processors may be configured to transmit, to a second wireless communication device, a PPSINR message identifying a PPSINR value. The one or more processors may be configured to receive, from the second wireless communication device and based on transmitting the PPSINR message identifying the PPSINR value, a communication in accordance with the PPSINR value.

Some aspects described herein relate to a second wireless communication device for wireless communication. The second wireless communication device may include one or more memories and one or more processors coupled to the one or more memories. The one or more processors may be configured to receive, from a first wireless communication device, a PPSINR message identifying a PPSINR value. The one or more processors may be configured to transmit, to the first wireless communication device and based on the reception of the PPSINR message identifying the PPSINR value, a communication in accordance with the PPSINR value.

Some aspects described herein relate to an apparatus for wireless communication. The apparatus may include means for transmitting, to a second wireless communication device, a PPSINR message identifying a PPSINR value. The apparatus may include means for receiving, from the second wireless communication device and based on transmitting the PPSINR message identifying the PPSINR value, a communication in accordance with the PPSINR value.

Some aspects described herein relate to an apparatus for wireless communication. The apparatus may include means for receiving, from a first wireless communication device, a PPSINR message identifying a PPSINR value. The apparatus may include means for transmitting, to the first wireless communication device and based on the reception of the PPSINR message identifying the PPSINR value, a communication in accordance with the PPSINR value.

Aspects of the present disclosure may generally be implemented by or as a method, apparatus, system, computer program product, non-transitory computer-readable medium, user equipment, base station, network node, network entity, wireless communication device, and/or processing system as substantially described with reference to, and as illustrated by, the specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

BRIEF DESCRIPTION OF THE DRAWINGS

The appended drawings illustrate some aspects of the present disclosure, but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

4

Figure 8:
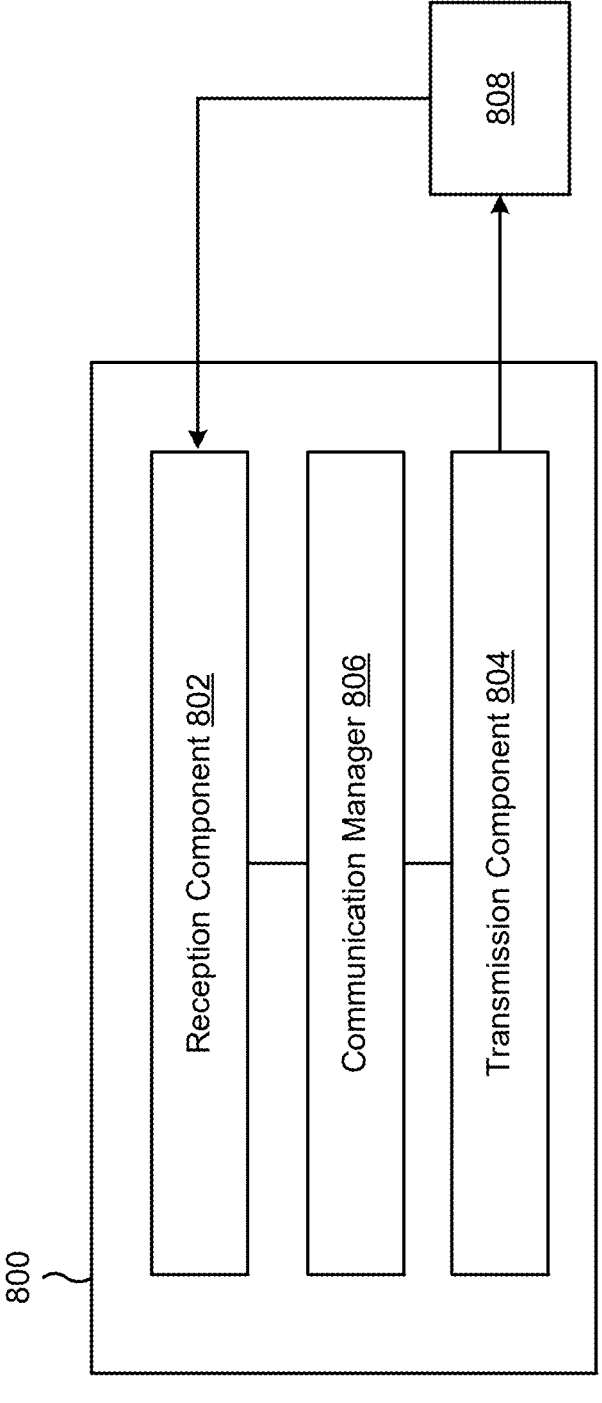

FIG. 8 is a diagram of an example apparatus for wireless communication, in accordance with the present disclosure.

Figure 9:
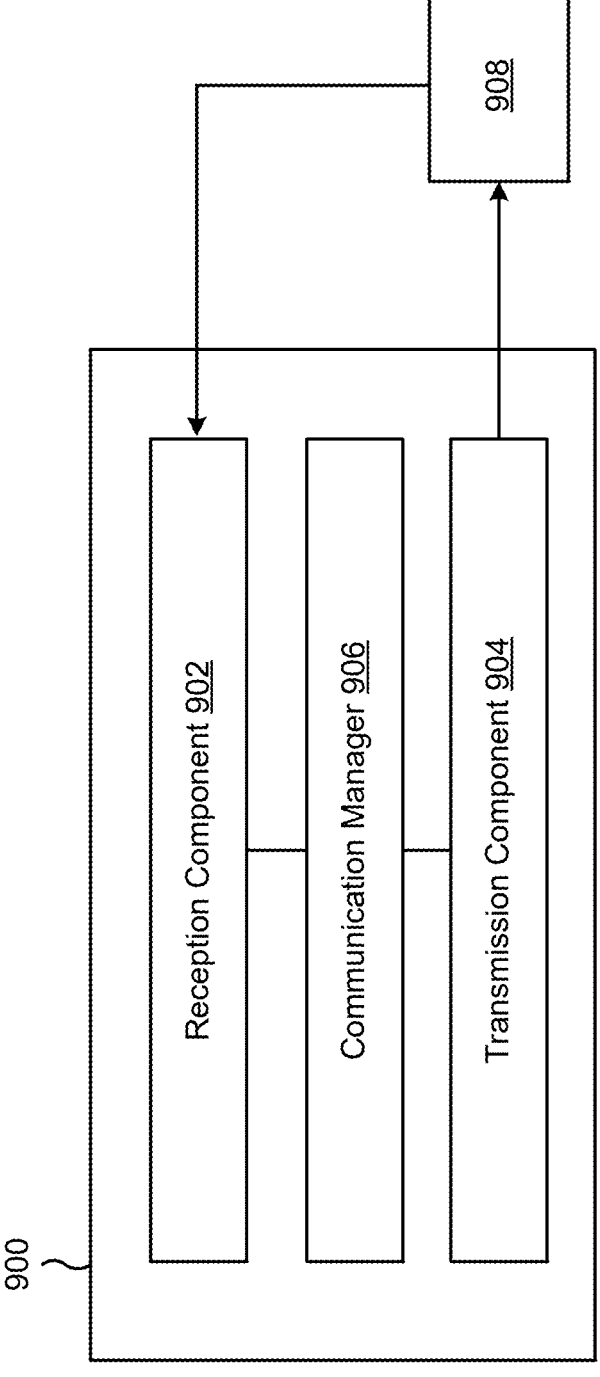

FIG. 9 is a diagram of an example apparatus for wireless communication, in accordance with the present disclosure.

DETAILED DESCRIPTION

Various aspects of the present disclosure are described hereinafter with reference to the accompanying drawings. However, aspects of the present disclosure may be embodied in many different forms and is not to be construed as limited to any specific aspect illustrated by or described with reference to an accompanying drawing or otherwise presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using various combinations or quantities of the aspects set forth herein. In addition, the scope of the disclosure is intended to cover an apparatus having, or a method that is practiced using, other structures and/or functionalities in addition to or other than the structures and/or functionalities with which various aspects of the disclosure set forth herein may be practiced. Any aspect of the disclosure disclosed herein may be embodied by one or more elements of a claim.

Several aspects of telecommunication systems will now be presented with reference to various methods, operations, apparatuses, and techniques. These methods, operations, apparatuses, and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

In some wireless communication devices, such as in a user equipment (UE) or a network node, transmission may occur in different frequency bands. As frequency increases, some wireless communication devices may experience a droop scenario in which an output power decreases as signal frequency increases. Droop occurs in power amplifiers (PAs) of wireless communication devices as the wireless communication devices use higher and higher frequency bands. For example, as a wireless communication device transitions from a first frequency band to a second frequency band that is higher than the first frequency band, a power amplifier of the wireless communication device may experience a reduction in amplification efficiency and a corresponding reduction in output power between the first frequency band and the second frequency band.

Higher frequency bands may provide wireless communication devices with bandwidth for achieving greater throughput than is achieved at lower frequency bands. However, higher levels of droop at higher frequencies may result in higher error vector magnitude (EVM) values on a transmitted signal. EVM may correspond to a measurement of a difference between an ideal transmitted signal and a received signal after demodulation and may represent a differential between an observed modulation constellation point and an ideal signal constellation point. By reducing EVM, a wireless communication device may achieve a higher signal quality (e.g., less distortion), which may improve throughput. Pre-equalization may include a set of techniques to compensate for frequency-dependent distortions that occur in a signal path, such as linear equalization, frequency domain equalization, non-linear pre-distortion, or waveform shaping, among other examples. Such techniques may use a channel response value or a droop value. However, it may be desirable to further reduce EVM values.

Various aspects relate generally to post-processing signal-to-interference-plus-noise ratio (PPSINR) signaling for channel adaptation. For example, a first wireless communication device may transmit information identifying a PPS-INR value relating to processing performed on an input signal to achieve a positive gain in SINR, such as equalization, time-domain summation, spherical combining, or other techniques. The second wireless communication device may use the information identifying the PPSINR value to perform pre-equalization, such as equalizing a channel response, cancelling a channel response, or flattening the channeling response, among other examples. In some aspects, the first wireless communication device may compress a PPSINR message conveying the PPSINR value to enable reporting without excessive overhead. In some aspects, a first wireless communication device and a second wireless communication device may exchange one or more signaling messages to configure PPSINR reporting to enable pre-equalization using the PPSINR value.

Particular aspects of the subject matter described in this disclosure can be implemented to realize one or more of the following potential advantages. In some examples, by reporting a PPSINR value, the described techniques can be used to perform pre-equalization on a channel to reduce EVM and improve throughput. In some examples, by applying a compression technique on a PPSINR message that conveys the PPSINR value, the described techniques can be used to signal the PPSINR value without excess overhead.

Multiple-access radio access technologies (RATs) have been adopted in various telecommunication standards to provide common protocols that enable wireless communication devices to communicate on a municipal, enterprise, national, regional, or global level. For example, 5G New Radio (NR) is part of a continuous mobile broadband evolution promulgated by the Third Generation Partnership Project (3GPP). 5G NR supports various technologies and use cases including enhanced mobile broadband (eMBB), ultra-reliable low-latency communication (URLLC), massive machine-type communication (mMTC), millimeter wave (mmWave) technology, beamforming, network slicing, edge computing, Internet of Things (IoT) connectivity and management, and network function virtualization (NFV).

As the demand for broadband access increases and as technologies supported by wireless communication networks evolve, further technological improvements may be adopted in or implemented for 5G NR or future RATs, such as 6G, to further advance the evolution of wireless communication for a wide variety of existing and new use cases and applications. Such technological improvements may be associated with new frequency band expansion, licensed and unlicensed spectrum access, overlapping spectrum use, small cell deployments, non-terrestrial network (NTN) deployments, disaggregated network architectures and network topology expansion, device aggregation, advanced duplex communication, sidelink and other device-to-device direct communication, IoT (including passive or ambient IoT) networks, reduced capability (RedCap) UE functionality, industrial connectivity, multiple-subscriber implementations, high-precision positioning, radio frequency (RF) sensing, and/or artificial intelligence or machine learning (AI/ML), among other examples. These technological improvements may support use cases such as wireless backhauls, wireless data centers, extended reality (XR) and metaverse applications, meta services for supporting vehicle connectivity, holographic and mixed reality communication, autonomous and collaborative robots, vehicle platooning and cooperative maneuvering, sensing networks, gesture monitoring, human-brain interfacing, digital twin applications, asset management, and universal coverage applications using non-terrestrial and/or aerial platforms, among other examples. The methods, operations, apparatuses, and techniques described herein may enable one or more of the foregoing technologies and/or support one or more of the foregoing use cases.

Figure 1:
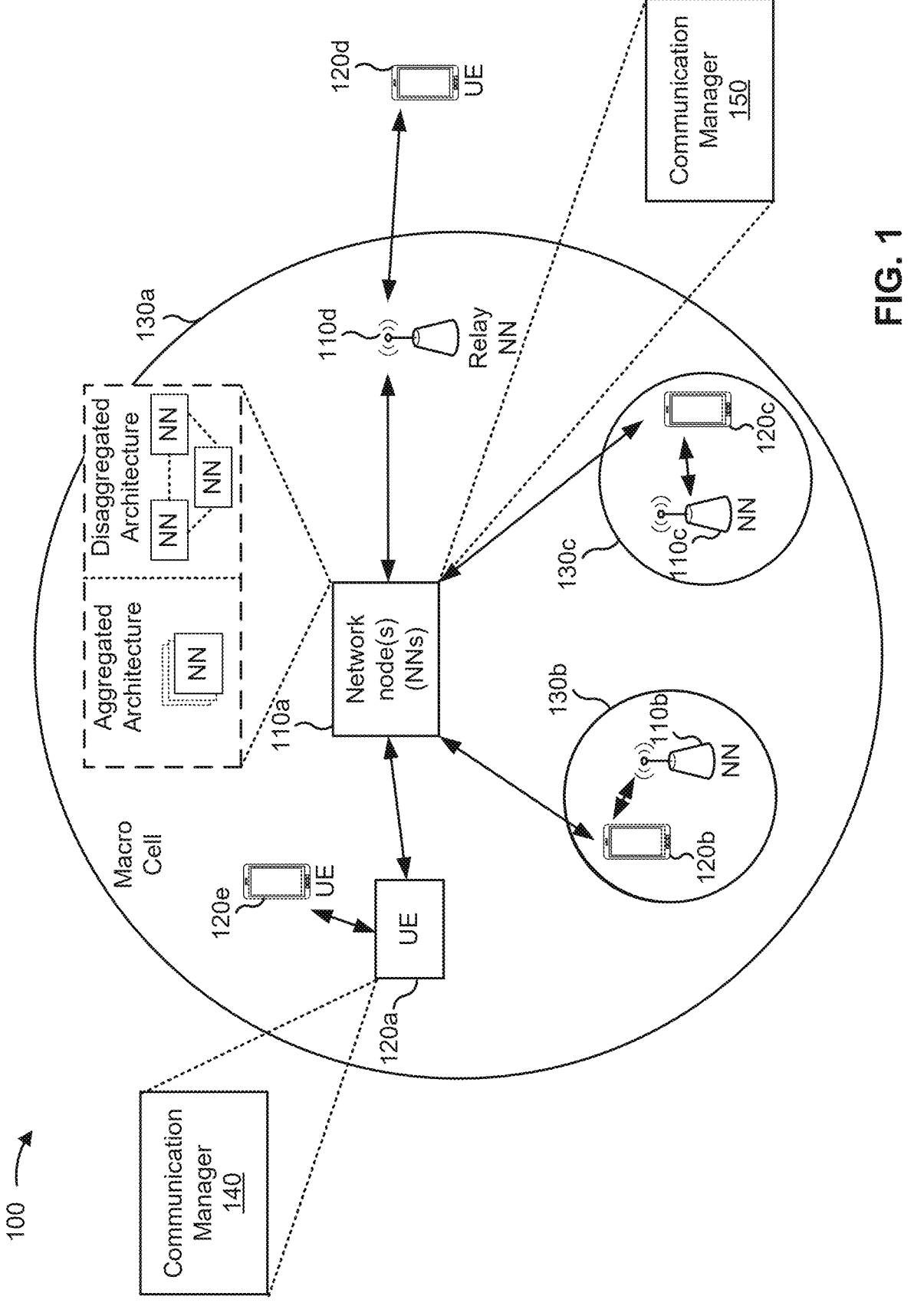
FIG. 1 is a diagram illustrating an example of a wireless communication network in accordance with the present disclosure.

FIG. 1 is a diagram illustrating an example of a wireless communication network 100 in accordance with the present disclosure. The wireless communication network 100 may be or may include elements of a 5G (or NR) network or a 6G network, among other examples. The wireless communication network 100 may include multiple network nodes 110, shown as a network node (NN) 110a, a network node 110b, a network node 110c, and a network node 110d. The network nodes 110 may support communications with multiple UEs 120, shown as a UE 120a, a UE 120b, a UE 120c, a UE 120d, and a UE 120e.

The network nodes 110 and the UEs 120 of the wireless communication network 100 may communicate using the electromagnetic spectrum, which may be subdivided by frequency or wavelength into various classes, bands, carriers, or channels. For example, devices of the wireless communication network 100 may communicate using one or more operating bands. In some aspects, multiple wireless communication networks 100 may be deployed in a given geographic area. Each wireless communication network 100 may support a particular RAT (which may also be referred to as an air interface) and may operate on one or more carrier frequencies in one or more frequency ranges. Examples of RATs include a 4G RAT, a 5G/NR RAT, and/or a 6G RAT, among other examples. In some examples, when multiple RATs are deployed in a given geographic area, each RAT in the geographic area may operate on different frequencies to avoid interference with one another.

Various operating bands have been defined as frequency range designations FR1 (410 MHz through 7.125 GHZ), FR2 (24.25 GHZ through 52.6 GHZ), FR3 (7.125 GHz through 24.25 GHz), FR4a or FR4-1 (52.6 GHz through 71 GHZ), FR4 (52.6 GHz through 114.25 GHZ), and FR5 (114.25 GHz through 300 GHZ). Although a portion of FR1 is greater than 6 GHz, FR1 is often referred to (interchangeably) as a "Sub-6 GHz" band in some documents and articles. Similarly, FR2 is often referred to (interchangeably) as a "millimeter wave" band in some documents and articles, despite being different than the extremely high frequency (EHF) band (30 GHz through 300 GHz), which is identified by the International Telecommunications Union (ITU) as a "millimeter wave" band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into mid-band frequencies. Thus, "sub-6 GHZ," if used herein, may broadly refer to frequencies that are less than 6 GHZ, that are within FR1, and/or that are included in mid-band frequencies. Similarly, the term "millimeter wave," if used herein, may broadly refer to frequencies that are included in mid-band frequencies, that are within FR2, FR4, FR4-a or FR4-1, or FR5, and/or that are within the EHF band. Higher frequency bands may extend 5G NR operation, 6G operation, and/or other RATs beyond 52.6 GHz. For example, each of FR4a, FR4-1, FR4, and FR5 falls within the EHF band. In some examples, the wireless communication network 100 may implement dynamic spectrum sharing (DSS), in which multiple RATs (for example, 4G/LTE and 5G/NR) are implemented with dynamic bandwidth allocation (for example, based on user demand) in a single frequency band. It is contemplated that the frequencies included in these operating bands (for example, FR1, FR2, FR3, FR4, FR4-a, FR4-1, and/or FR5) may be modified, and techniques described herein may be applicable to those modified frequency ranges.

A network node 110 may include one or more devices, components, or systems that enable communication between a UE 120 and one or more devices, components, or systems of the wireless communication network 100. A network node 110 may be, may include, or may also be referred to as an NR network node, a 5G network node, a 6G network node, a Node B, an eNB, a gNB, an access point (AP), a transmission reception point (TRP), a mobility element, a core, a network entity, a network element, a network equipment, and/or another type of device, component, or system included in a radio access network (RAN).

A network node 110 may be implemented as a single physical node (for example, a single physical structure) or may be implemented as two or more physical nodes (for example, two or more distinct physical structures). For example, a network node 110 may be a device or system that implements part of a radio protocol stack, a device or system that implements a full radio protocol stack (such as a full gNB protocol stack), or a collection of devices or systems that collectively implement the full radio protocol stack. For example, and as shown, a network node 110 may be an aggregated network node (having an aggregated architecture), meaning that the network node 110 may implement a full radio protocol stack that is physically and logically integrated within a single node (for example, a single physical structure) in the wireless communication network 100. For example, an aggregated network node 110 may consist of a single standalone base station or a single TRP that uses a full radio protocol stack to enable or facilitate communication between a UE 120 and a core network of the wireless communication network 100.

Alternatively, and as also shown, a network node 110 may be a disaggregated network node (sometimes referred to as a disaggregated base station), meaning that the network node 110 may implement a radio protocol stack that is physically distributed and/or logically distributed among two or more nodes in the same geographic location or in different geographic locations. For example, a disaggregated network node may have a disaggregated architecture. In some deployments, disaggregated network nodes 110 may be used in an integrated access and backhaul (IAB) network, in an open radio access network (O-RAN) (such as a network configuration in compliance with the O-RAN Alliance), or in a virtualized radio access network (vRAN), also known as a cloud radio access network (C-RAN), to facilitate scaling by separating base station functionality into multiple units that can be individually deployed.

The network nodes 110 of the wireless communication network 100 may include one or more central units (CUs), one or more distributed units (DUs), and/or one or more radio units (RUS). A CU may host one or more higher layer control functions, such as radio resource control (RRC) functions, packet data convergence protocol (PDCP) functions, and/or service data adaptation protocol (SDAP) functions, among other examples. A DU may host one or more of a radio link control (RLC) layer, a medium access control (MAC) layer, and/or one or more higher physical (PHY) layers depending, at least in part, on a functional split, such as a functional split defined by the 3GPP. In some examples, a DU also may host one or more lower PHY layer functions, such as a fast Fourier transform (FFT), an inverse FFT (IFFT), beamforming, physical random access channel (PRACH) extraction and filtering, and/or scheduling of resources for one or more UEs 120, among other examples. An RU may host RF processing functions or lower PHY layer functions, such as an FFT, an iFFT, beamforming, or PRACH extraction and filtering, among other examples, according to a functional split, such as a lower layer functional split. In such an architecture, each RU can be operated to handle over the air (OTA) communication with one or more UEs 120.

In some aspects, a single network node 110 may include a combination of one or more CUs, one or more DUs, and/or one or more RUs. Additionally or alternatively, a network node 110 may include one or more Near-Real Time (Near-RT) RAN Intelligent Controllers (RICs) and/or one or more Non-Real Time (Non-RT) RICs. In some examples, a CU, a DU, and/or an RU may be implemented as a virtual unit, such as a virtual central unit (VCU), a virtual distributed unit (VDU), or a virtual radio unit (VRU), among other examples. A virtual unit may be implemented as a virtual network function, such as associated with a cloud deployment.

Some network nodes 110 (for example, a base station, an RU, or a TRP) may provide communication coverage for a particular geographic area. In the 3GPP, the term "cell" can refer to a coverage area of a network node 110 or to a network node 110 itself, depending on the context in which the term is used. A network node 110 may support one or multiple (for example, three) cells. In some examples, a network node 110 may provide communication coverage for a macro cell, a pico cell, a femto cell, or another type of cell. A macro cell May cover a relatively large geographic area (for example, several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In some examples, a cell may not necessarily be stationary. For example, the geographic area of the cell may move according to the location of an associated mobile network node 110 (for example, a train, a satellite base station, an unmanned aerial vehicle, or a NTN network node).

The wireless communication network 100 may be a heterogeneous network that includes network nodes 110 of different types, such as macro network nodes, pico network nodes, femto network nodes, relay network nodes, aggregated network nodes, and/or disaggregated network nodes, among other examples. In the example shown in FIG. 1, the network node 110a may be a macro network node for a macro cell 130*a*, the network node 110*b* may be a pico network node for a pico cell 130*b*, and the network node 110*c* may be a femto network node for a femto cell 130*c*. Various different types of network nodes 110 may generally transmit at different power levels, serve different coverage areas, and/or have different impacts on interference in the wireless communication network 100 than other types of network nodes 110. For example, macro network nodes may have a high transmit power level (for example, 5 to 40 watts), whereas pico network nodes, femto network nodes, and relay network nodes may have lower transmit power levels (for example, 0.1 to 2 watts).

In some examples, a network node 110 may be, may include, or may operate as an RU, a TRP, or a base station that communicates with one or more UEs 120 via a radio access link (which may be referred to as a "Uu" link). The radio access link may include a downlink and an uplink. "Downlink" (or "DL") refers to a communication direction from a network node 110 to a UE 120, and "uplink" (or "UL") refers to a communication direction from a UE 120 to a network node 110. Downlink channels may include one or more control channels and one or more data channels. A downlink control channel may be used to transmit downlink control information (DCI) (for example, scheduling information, reference signals, and/or configuration information) from a network node 110 to a UE 120. A downlink data channel may be used to transmit downlink data (for example, user data associated with a UE 120) from a network node 110 to a UE 120. Downlink control channels may include one or more physical downlink control channels (PDCCHs), and downlink data channels may include one or more physical downlink shared channels (PDSCHs). Uplink channels may similarly include one or more control channels and one or more data channels. An uplink control channel may be used to transmit uplink control information (UCI) (for example, reference signals and/or feedback corresponding to one or more downlink transmissions) from a UE 120 to a network node 110. An uplink data channel may be used to transmit uplink data (for example, user data associated with a UE 120) from a UE 120 to a network node 110. Uplink control channels may include one or more physical uplink control channels (PUCCHs), and uplink data channels may include one or more physical uplink shared channels (PUSCHs). The downlink and the uplink may each include a set of resources on which the network node 110 and the UE 120 may communicate.

Downlink and uplink resources may include time domain resources (frames, subframes, slots, and/or symbols), frequency domain resources (frequency bands, component carriers, subcarriers, resource blocks, and/or resource elements), and/or spatial domain resources (particular transmit directions and/or beam parameters). Frequency domain resources of some bands may be subdivided into bandwidth parts (BWPs). A BWP may be a continuous block of frequency domain resources (for example, a continuous block of resource blocks) that are allocated for one or more UEs 120. A UE 120 may be configured with both an uplink BWP and a downlink BWP (where the uplink BWP and the downlink BWP may be the same BWP or different BWPs). A BWP may be dynamically configured (for example, by a network node 110 transmitting a DCI configuration to the one or more UEs 120) and/or reconfigured, which means that a BWP can be adjusted in real-time (or near-real-time) based on changing network conditions in the wireless communication network 100 and/or based on the specific requirements of the one or more UEs 120. This enables more efficient use of the available frequency domain resources in the wireless communication network 100 because fewer frequency domain resources may be allocated to a BWP for a UE 120 (which may reduce the number of frequency domain resources that a UE 120 is required to monitor), leaving more frequency domain resources to be spread across multiple UEs 120. Thus, BWPs may also assist in the implementation of lower-capability UEs 120 by facilitating the configuration of smaller bandwidths for communication by such UEs 120.

As described above, in some aspects, the wireless communication network 100 may be, may include, or may be included in, an IAB network. In an IAB network, at least one network node 110 is an anchor network node that communicates with a core network. An anchor network node 110 may also be referred to as an IAB donor (or "IAB-donor"). The anchor network node 110 may connect to the core network via a wired backhaul link. For example, an Ng interface of the anchor network node 110 may terminate at the core network. Additionally or alternatively, an anchor network node 110 may connect to one or more devices of the core network that provide a core access and mobility management function (AMF). An IAB network also generally includes multiple non-anchor network nodes 110, which may also be referred to as relay network nodes or simply as IAB nodes (or "IAB-nodes"). Each non-anchor network node 110 may communicate directly with the anchor network node 110 via a wireless backhaul link to access the core network, or may communicate indirectly with the anchor network node 110 via one or more other non-anchor network nodes 110 and associated wireless backhaul links that form a backhaul path to the core network. Some anchor network node 110 or other non-anchor network node 110 may also communicate directly with one or more UEs 120 via wireless access links that carry access traffic. In some examples, network resources for wireless communication (such as time resources, frequency resources, and/or spatial resources) may be shared between access links and backhaul links.

In some examples, any network node 110 that relays communications may be referred to as a relay network node, a relay station, or simply as a relay. A relay may receive a transmission of a communication from an upstream station (for example, another network node 110 or a UE 120) and transmit the communication to a downstream station (for example, a UE 120 or another network node 110). In this case, the wireless communication network 100 may include or be referred to as a "multi-hop network." In the example shown in FIG. 1, the network node 110*d* (for example, a relay network node) may communicate with the network node 110*a* (for example, a macro network node) and the UE 120*d* in order to facilitate communication between the network node 110*a* and the UE 120*d*. Additionally or alternatively, a UE 120 may be or may operate as a relay station that can relay transmissions to or from other UEs 120. A UE 120 that relays communications may be referred to as a UE relay or a relay UE, among other examples.

The UEs 120 may be physically dispersed throughout the wireless communication network 100, and each UE 120 may be stationary or mobile. A UE 120 may be, may include, or may be included in an access terminal, another terminal, a mobile station, or a subscriber unit. A UE 120 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, and/or smart jewelry, such as a smart ring or a smart bracelet), an entertainment device (for example, a music device, a video device, and/or a satellite radio), an XR device, a vehicular component or sensor, a smart meter or sensor, industrial manufacturing equipment, a Global Navigation Satellite System (GNSS) device (such as a Global Positioning System device or another type of positioning device), a UE function of a network node, and/or any other suitable device or function that may communicate via a wireless medium.

A UE 120 and/or a network node 110 may include one or more chips, system-on-chips (SoCs), chipsets, packages, or devices that individually or collectively constitute or comprise a processing system. The processing system includes processor (or "processing") circuitry in the form of one or multiple processors, microprocessors, processing units (such as central processing units (CPUs), graphics processing units (GPUs), neural processing units (NPUs) and/or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set, or may include the group of processors all being configured or configurable to perform the set of functions.

The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code (such as software) that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G, or 6G compliant) modem). In some implementations, one or more processors of the processing system include or implement one or more of the modems. The processing system may further include or be coupled with multiple radios (collectively "the radio"), multiple RF chains, or multiple transceivers, each of which may in turn be coupled with one or more of multiple antennas. In some implementations, one or more processors of the processing system include or implement one or more of the radios, RF chains or transceivers. The UE 120 may include or may be included in a housing that houses components associated with the UE 120 including the processing system.

Some UEs 120 may be considered machine-type communication (MTC) UEs, evolved or enhanced machine-type communication (eMTC), UEs, further enhanced eMTC (feMTC) UEs, or enhanced feMTC (efeMTC) UEs, or further evolutions thereof, all of which may be simply referred to as "MTC UEs". An MTC UE may be, may include, or may be included in or coupled with a robot, an uncrewed aerial vehicle, a remote device, a sensor, a meter, a monitor, and/or a location tag. Some UEs 120 may be considered IoT devices and/or may be implemented as NB-IOT (narrowband IoT) devices. An IoT UE or NB-IOT device may be, may include, or may be included in or coupled with an industrial machine, an appliance, a refrigerator, a doorbell camera device, a home automation device, and/or a light fixture, among other examples. Some UEs 120 may be considered Customer Premises Equipment, which may include telecommunications devices that are installed at a customer location (such as a home or office) to enable access to a service provider's network (such as included in or in communication with the wireless communication network 100).

Some UEs 120 may be classified according to different categories in association with different complexities and/or different capabilities. UEs 120 in a first category may facilitate massive IoT in the wireless communication network 100, and may offer low complexity and/or cost relative to UEs 120 in a second category. UEs 120 in a second category may include mission-critical IoT devices, legacy UEs, baseline UEs, high-tier UEs, advanced UEs, full-capability UEs, and/or premium UEs that are capable of URLLC, enhanced mobile broadband (eMBB), and/or precise positioning in the wireless communication network 100, among other examples. A third category of UEs 120 may have mid-tier complexity and/or capability (for example, a capability between UEs 120 of the first category and UEs 120 of the second capability). A UE 120 of the third category may be referred to as a reduced capacity UE ("RedCap UE"), a mid-tier UE, an NR-Light UE, and/or an NR-Lite UE, among other examples. RedCap UEs may bridge a gap between the capability and complexity of NB-IoT devices and/or eMTC UEs, and mission-critical IoT devices and/or premium UEs. RedCap UEs may include, for example, wearable devices, IoT devices, industrial sensors, and/or cameras that are associated with a limited bandwidth, power capacity, and/or transmission range, among other examples. RedCap UEs may support healthcare environments, building automation, electrical distribution, process automation, transport and logistics, and/or smart city deployments, among other examples.

In some examples, two or more UEs 120 (for example, shown as UE 120a and UE 120e) may communicate directly with one another using sidelink communications (for example, without communicating by way of a network node 110 as an intermediary). As an example, the UE 120a may directly transmit data, control information, or other signaling as a sidelink communication to the UE 120e. This is in contrast to, for example, the UE 120a first transmitting data in an UL communication to a network node 110, which then transmits the data to the UE 120e in a DL communication. In various examples, the UEs 120 may transmit and receive sidelink communications using peer-to-peer (P2P) communication protocols, device-to-device (D2D) communication protocols, vehicle-to-everything (V2X) communication protocols (which may include vehicle-to-vehicle (V2V) protocols, vehicle-to-infrastructure (V2I) protocols, and/or vehicle-to-pedestrian (V2P) protocols), and/or mesh network communication protocols. In some deployments and configurations, a network node 110 may schedule and/or allocate resources for sidelink communications between UEs 120 in the wireless communication network 100. In some other deployments and configurations, a UE 120 (instead of a network node 110) may perform, or collaborate or negotiate with one or more other UEs to perform, scheduling operations, resource selection operations, and/or other operations for sidelink communications.

In various examples, some of the network nodes 110 and the UEs 120 of the wireless communication network 100 may be configured for full-duplex operation in addition to half-duplex operation. A network node 110 or a UE 120 operating in a half-duplex mode may perform only one of transmission or reception during particular time resources, such as during particular slots, symbols, or other time periods. Half-duplex operation may involve time-division duplexing (TDD), in which DL transmissions of the network node 110 and UL transmissions of the UE 120 do not occur in the same time resources (that is, the transmissions do not overlap in time). In contrast, a network node 110 or a UE 120 operating in a full-duplex mode can transmit and receive communications concurrently (for example, in the same time resources). By operating in a full-duplex mode, network nodes 110 and/or UEs 120 may generally increase the capacity of the network and the radio access link. In some examples, full-duplex operation may involve frequency-division duplexing (FDD), in which DL transmissions of the network node 110 are performed in a first frequency band or on a first component carrier and transmissions of the UE 120 are performed in a second frequency band or on a second component carrier different than the first frequency band or the first component carrier, respectively. In some examples, full-duplex operation may be enabled for a UE 120 but not for a network node 110. For example, a UE 120 may simultaneously transmit an UL transmission to a first network node 110 and receive a DL transmission from a second network node 110 in the same time resources. In some other examples, full-duplex operation may be enabled for a network node 110 but not for a UE 120. For example, a network node 110 may simultaneously transmit a DL transmission to a first UE 120 and receive an UL transmission from a second UE 120 in the same time resources. In some other examples, full-duplex operation may be enabled for both a network node 110 and a UE 120.

In some examples, the UEs 120 and the network nodes 110 may perform MIMO communication. "MIMO" generally refers to transmitting or receiving multiple signals (such as multiple layers or multiple data streams) simultaneously over the same time and frequency resources. MIMO techniques generally exploit multipath propagation. MIMO may be implemented using various spatial processing or spatial multiplexing operations. In some examples, MIMO may support simultaneous transmission to multiple receivers, referred to as multi-user MIMO (MU-MIMO). Some RATs may employ advanced MIMO techniques, such as mTRP operation (including redundant transmission or reception on multiple TRPs), reciprocity in the time domain or the frequency domain, single-frequency-network (SFN) transmission, or non-coherent joint transmission (NC-JT).

In some aspects, a first wireless communication device or a second wireless communication device (e.g., a UE 120 or a network node 110) may include a communication manager 140 or a communication manager 150. As described in more detail elsewhere herein, the communication manager 140 or 150 may transmit, to a second wireless communication device, a PPSINR message identifying a PPSINR value; and receive, from the second wireless communication device and based on transmitting the PPSINR message identifying the PPSINR value, a communication in accordance with the PPSINR value. Additionally, or alternatively, the communication manager 140 or 150 may receive, from a first wireless communication device, a PPSINR message identifying a PPSINR value; and transmit, to the first wireless communication device and based on the reception of the PPSINR message identifying the PPSINR value, a communication in accordance with the PPSINR value. Additionally, or alternatively, the communication manager 140 or 150 may perform one or more other operations described herein.

As indicated above, FIG. 1 is provided as an example. Other examples may differ from what is described with regard to FIG. 1.

Figure 2:
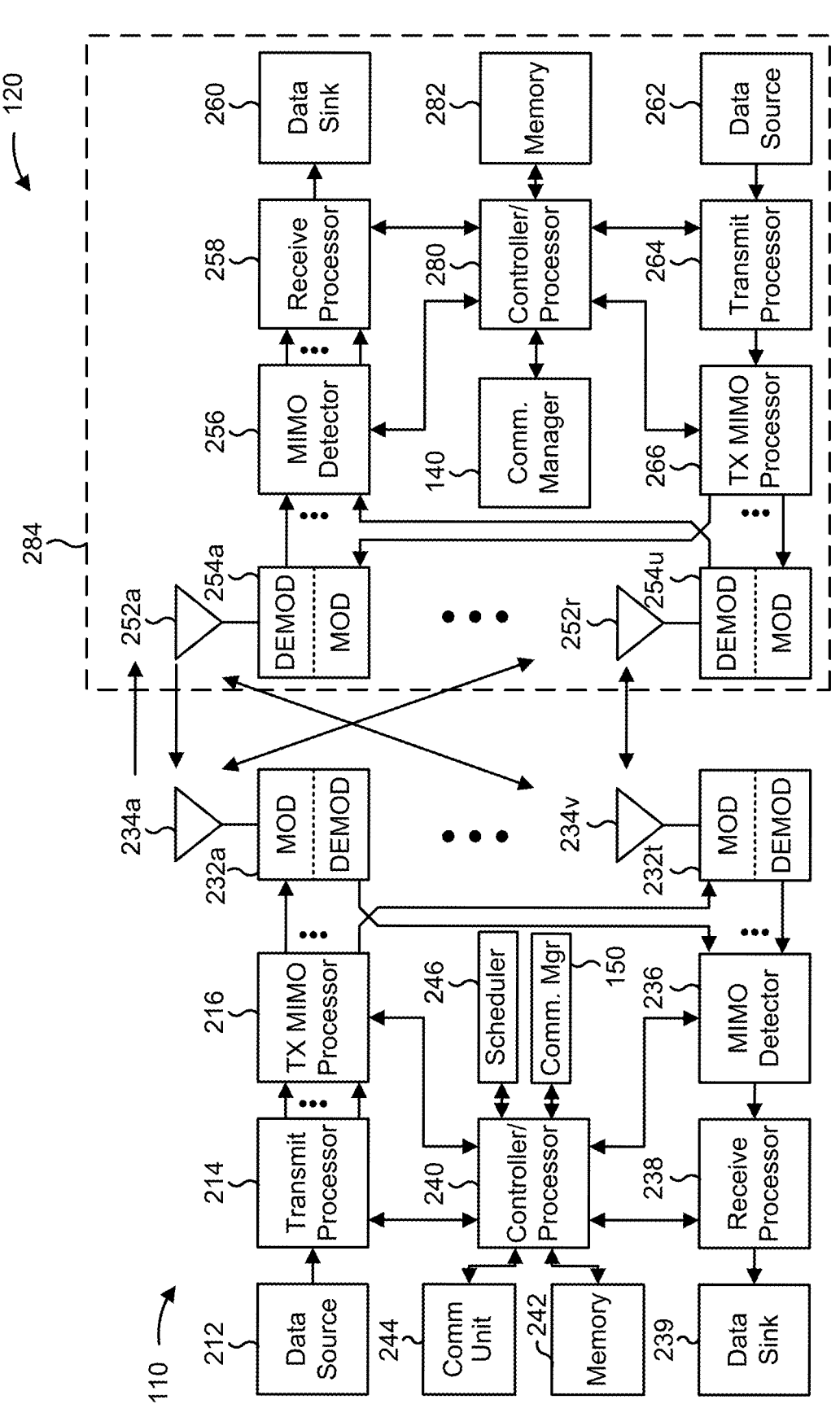
FIG. 2 is a diagram illustrating an example network node in communication with an example user equipment (UE) in a wireless network.

FIG. 2 is a diagram illustrating an example network node 110 in communication with an example UE 120 in a wireless network.

As shown in FIG. 2, the network node 110 may include a data source 212, a transmit processor 214, a transmit (TX) MIMO processor 216, a set of modems 232 (shown as 232a through 232t, where t≥1), a set of antennas 234 (shown as 234a through 234v, where v≥1), a MIMO detector 236, a receive processor 238, a data sink 239, a controller/processor 240, a memory 242, a communication unit 244, a scheduler 246, and/or a communication manager 150, among other examples. In some configurations, one or a combination of the antenna(s) 234, the modem(s) 232, the MIMO detector 236, the receive processor 238, the transmit processor 214, and/or the TX MIMO processor 216 may be included in a transceiver of the network node 110. The transceiver may be under control of and used by one or more processors, such as the controller/processor 240, and in some aspects in conjunction with processor-readable code stored in the memory 242, to perform aspects of the methods, processes, and/or operations described herein. In some aspects, the network node 110 May include one or more interfaces, communication components, and/or other components that facilitate communication with the UE 120 or another network node.

The terms "processor," "controller," or "controller/processor" may refer to one or more controllers and/or one or more processors. For example, reference to "a/the processor," "a/the controller/processor," or the like (in the singular) should be understood to refer to any one or more of the processors described in connection with FIG. 2, such as a single processor or a combination of multiple different processors. Reference to "one or more processors" should be understood to refer to any one or more of the processors described in connection with FIG. 2. For example, one or more processors of the network node 110 may include transmit processor 214, TX MIMO processor 216, MIMO detector 236, receive processor 238, and/or controller/processor 240. Similarly, one or more processors of the UE 120 may include MIMO detector 256, receive processor 258, transmit processor 264, TX MIMO processor 266, and/or controller/processor 280.

In some aspects, a single processor may perform all of the operations described as being performed by the one or more processors. In some aspects, a first set of (one or more) processors of the one or more processors may perform a first operation described as being performed by the one or more processors, and a second set of (one or more) processors of the one or more processors may perform a second operation described as being performed by the one or more processors. The first set of processors and the second set of processors may be the same set of processors or may be different sets of processors. Reference to "one or more memories" should be understood to refer to any one or more memories of a corresponding device, such as the memory described in connection with FIG. 2. For example, operation described as being performed by one or more memories can be performed by the same subset of the one or more memories or different subsets of the one or more memories.

For downlink communication from the network node 110 to the UE 120, the transmit processor 214 may receive data ("downlink data") intended for the UE 120 (or a set of UEs that includes the UE 120) from the data source 212 (such as a data pipeline or a data queue). In some examples, the transmit processor 214 may select one or more MCSs for the UE 120 in accordance with one or more channel quality indicators (CQIs) received from the UE 120. The network node 110 may process the data (for example, including encoding the data) for transmission to the UE 120 on a downlink in accordance with the MCS(s) selected for the UE 120 to generate data symbols. The transmit processor 214 may process system information (for example, semi-static resource partitioning information (SRPI)) and/or control information (for example, CQI requests, grants, and/or upper layer signaling) and provide overhead symbols and/or control symbols. The transmit processor 214 may generate reference symbols for reference signals (for example, a cell-specific reference signal (CRS), a demodulation reference signal (DMRS), or a channel state information (CSI) reference signal (CSI-RS)) and/or synchronization signals (for example, a primary synchronization signal (PSS) or a secondary synchronization signals (SSS)).

The TX MIMO processor 216 may perform spatial processing (for example, precoding) on the data symbols, the control symbols, the overhead symbols, and/or the reference symbols, if applicable, and may provide a set of output symbol streams (for example, T output symbol streams) to the set of modems 232. For example, each output symbol stream may be provided to a respective modulator component (shown as MOD) of a modem 232. Each modem 232 may use the respective modulator component to process (for example, to modulate) a respective output symbol stream (for example, for orthogonal frequency division multiplexing (OFDM)) to obtain an output sample stream. Each modem 232 may further use the respective modulator component to process (for example, convert to analog, amplify, filter, and/or upconvert) the output sample stream to obtain a time domain downlink signal. The modems 232a through 232t may together transmit a set of downlink signals (for example, T downlink signals) via the corresponding set of antennas 234.

A downlink signal may include a DCI communication, a MAC control element (MAC-CE) communication, an RRC communication, a downlink reference signal, or another type of downlink communication. Downlink signals may be transmitted on a PDCCH, a PDSCH, and/or on another downlink channel. A downlink signal may carry one or more transport blocks (TBs) of data. A TB may be a unit of data that is transmitted over an air interface in the wireless communication network 100. A data stream (for example, from the data source 212) may be encoded into multiple TBs for transmission over the air interface. The number of TBs used to carry the data associated with a particular data stream may be associated with a TB size common to the multiple TBs. The TB size may be based on or otherwise associated with radio channel conditions of the air interface, the MCS used for encoding the data, the downlink resources allocated for transmitting the data, and/or another parameter. In general, the larger the TB size, the greater the amount of data that can be transmitted in a single transmission, which reduces signaling overhead. However, larger TB sizes may be more prone to transmission and/or reception errors than smaller TB sizes, but such errors may be mitigated by more robust error correction techniques.

For uplink communication from the UE 120 to the network node 110, uplink signals from the UE 120 may be received by an antenna 234, may be processed by a modem 232 (for example, a demodulator component, shown as DEMOD, of a modem 232), may be detected by the MIMO detector 236 (for example, a receive (Rx) MIMO processor) if applicable, and/or may be further processed by the receive processor 238 to obtain decoded data and/or control information. The receive processor 238 may provide the decoded data to a data sink 239 (which may be a data pipeline, a data queue, and/or another type of data sink) and provide the decoded control information to a processor, such as the controller/processor 240.

The network node 110 may use the scheduler 246 to schedule one or more UEs 120 for downlink or uplink communications. In some aspects, the scheduler 246 may use DCI to dynamically schedule DL transmissions to the UE 120 and/or UL transmissions from the UE 120. In some examples, the scheduler 246 may allocate recurring time domain resources and/or frequency domain resources that the UE 120 may use to transmit and/or receive communications using an RRC configuration (for example, a semi-static configuration), for example, to perform semi-persistent scheduling (SPS) or to configure a configured grant (CG) for the UE 120.

One or more of the transmit processor 214, the TX MIMO processor 216, the modem 232, the antenna 234, the MIMO detector 236, the receive processor 238, and/or the controller/processor 240 may be included in an RF chain of the network node 110. An RF chain may include one or more filters, mixers, oscillators, amplifiers, analog-to-digital converters (ADCs), and/or other devices that convert between an analog signal (such as for transmission or reception via an air interface) and a digital signal (such as for processing by one or more processors of the network node 110). In some aspects, the RF chain may be or may be included in a transceiver of the network node 110.

In some examples, the network node 110 may use the communication unit 244 to communicate with a core network and/or with other network nodes. The communication unit 244 may support wired and/or wireless communication protocols and/or connections, such as Ethernet, optical fiber, common public radio interface (CPRI), and/or a wired or wireless backhaul, among other examples. The network node 110 may use the communication unit 244 to transmit and/or receive data associated with the UE 120 or to perform network control signaling, among other examples. The communication unit 244 may include a transceiver and/or an interface, such as a network interface.

The UE 120 may include a set of antennas 252 (shown as antennas 252a through 252r, where r≥1), a set of modems 254 (shown as modems 254a through 254u, where u≥1), a MIMO detector 256, a receive processor 258, a data sink 260, a data source 262, a transmit processor 264, a TX MIMO processor 266, a controller/processor 280, a memory 282, and/or a communication manager 140, among other examples. One or more of the components of the UE 120 may be included in a housing 284. In some aspects, one or a combination of the antenna(s) 252, the modem(s) 254, the MIMO detector 256, the receive processor 258, the transmit processor 264, or the TX MIMO processor 266 may be included in a transceiver that is included in the UE 120. The transceiver may be under control of and used by one or more processors, such as the controller/processor 280, and in some aspects in conjunction with processor-readable code stored in the memory 282, to perform aspects of the methods, processes, or operations described herein. In some aspects, the UE 120 may include another interface, another communication component, and/or another component that facilitates communication with the network node 110 and/or another UE 120.

For downlink communication from the network node 110 to the UE 120, the set of antennas 252 may receive the downlink communications or signals from the network node 110 and may provide a set of received downlink signals (for example, R received signals) to the set of modems 254. For example, each received signal may be provided to a respective demodulator component (shown as DEMOD) of a modem 254. Each modem 254 may use the respective demodulator component to condition (for example, filter, amplify, downconvert, and/or digitize) a received signal to obtain input samples. Each modem 254 may use the respective demodulator component to further demodulate or process the input samples (for example, for OFDM) to obtain received symbols. The MIMO detector 256 may obtain received symbols from the set of modems 254, may perform MIMO detection on the received symbols if applicable, and may provide detected symbols. The receive processor 258 may process (for example, decode) the detected symbols, may provide decoded data for the UE 120 to the data sink 260 (which may include a data pipeline, a data queue, and/or an application executed on the UE 120), and may provide decoded control information and system information to the controller/processor 280.

For uplink communication from the UE 120 to the network node 110, the transmit processor 264 may receive and process data ("uplink data") from a data source 262 (such as a data pipeline, a data queue, and/or an application executed on the UE 120) and control information from the controller/processor 280. The control information may include one or more parameters, feedback, one or more signal measurements, and/or other types of control information. In some aspects, the receive processor 258 and/or the controller/processor 280 may determine, for a received signal (such as received from the network node 110 or another UE), one or more parameters relating to transmission of the uplink communication. The one or more parameters may include a reference signal received power (RSRP) parameter, a received signal strength indicator (RSSI) parameter, a reference signal received quality (RSRQ) parameter, a CQI parameter, or a transmit power control (TPC) parameter, among other examples. The control information may include an indication of the RSRP parameter, the RSSI parameter, the RSRQ parameter, the CQI parameter, the TPC parameter, and/or another parameter. The control information may facilitate parameter selection and/or scheduling for the UE 120 by the network node 110.

The transmit processor 264 may generate reference symbols for one or more reference signals, such as an uplink DMRS, an uplink sounding reference signal (SRS), and/or another type of reference signal. The symbols from the transmit processor 264 may be precoded by the TX MIMO processor 266, if applicable, and further processed by the set of modems 254 (for example, for DFT-s-OFDM or CP-OFDM). The TX MIMO processor 266 may perform spatial processing (for example, precoding) on the data symbols, the control symbols, the overhead symbols, and/or the reference symbols, if applicable, and may provide a set of output symbol streams (for example, U output symbol streams) to the set of modems 254. For example, each output symbol stream may be provided to a respective modulator component (shown as MOD) of a modem 254. Each modem 254 may use the respective modulator component to process (for example, to modulate) a respective output symbol stream (for example, for OFDM) to obtain an output sample stream. Each modem 254 may further use the respective modulator component to process (for example, convert to analog, amplify, filter, and/or upconvert) the output sample stream to obtain an uplink signal.

The modems 254a through 254u may transmit a set of uplink signals (for example, R uplink signals or U uplink symbols) via the corresponding set of antennas 252. An uplink signal may include a UCI communication, a MAC-CE communication, an RRC communication, or another type of uplink communication. Uplink signals may be transmitted on a PUSCH, a PUCCH, and/or another type of uplink channel. An uplink signal may carry one or more TBs of data. Sidelink data and control transmissions (that is, transmissions directly between two or more UEs 120) may generally use similar techniques as were described for uplink data and control transmission, and may use sidelink-specific channels such as a physical sidelink shared channel (PSSCH), a physical sidelink control channel (PSCCH), and/or a physical sidelink feedback channel (PSFCH).

One or more antennas of the set of antennas 252 or the set of antennas 234 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 2. As used herein, "antenna" can refer to one or more antennas, one or more antenna panels, one or more antenna groups, one or more sets of antenna elements, or one or more antenna arrays. "Antenna panel" can refer to a group of antennas (such as antenna elements) arranged in an array or panel, which may facilitate beamforming by manipulating parameters of the group of antennas. "Antenna module" may refer to circuitry including one or more antennas, which may also include one or more other components (such as filters, amplifiers, or processors) associated with integrating the antenna module into a wireless communication device.

In some examples, each of the antenna elements of an antenna 234 or an antenna 252 may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, and/or other types of antennas arranged in a linear pattern, a two-dimensional pattern, or another pattern. A spacing between antenna elements may be such that signals with a desired wavelength transmitted separately by the antenna elements may interact or interfere constructively and destructively along various directions (such as to form a desired beam). For example, given an expected range of wavelengths or frequencies, the spacing may provide a quarter wavelength, a half wavelength, or another fraction of a wavelength of spacing between neighboring antenna elements to allow for the desired constructive and destructive interference patterns of signals transmitted by the separate antenna elements within that expected range.

The amplitudes and/or phases of signals transmitted via antenna elements and/or sub-elements may be modulated and shifted relative to each other (such as by manipulating phase shift, phase offset, and/or amplitude) to generate one or more beams, which is referred to as beamforming. The term "beam" may refer to a directional transmission of a wireless signal toward a receiving device or otherwise in a desired direction. "Beam" may also generally refer to a direction associated with such a directional signal transmission, a set of directional resources associated with the signal transmission (for example, an angle of arrival, a horizontal direction, and/or a vertical direction), and/or a set of parameters that indicate one or more aspects of a directional signal, a direction associated with the signal, and/or a set of directional resources associated with the signal. In some implementations, antenna elements may be individually selected or deselected for directional transmission of a signal (or signals) by controlling amplitudes of one or more corresponding amplifiers and/or phases of the signal(s) to form one or more beams. The shape of a beam (such as the amplitude, width, and/or presence of side lobes) and/or the direction of a beam (such as an angle of the beam relative to a surface of an antenna array) can be dynamically controlled by modifying the phase shifts, phase offsets, and/or amplitudes of the multiple signals relative to each other.

Different UEs 120 or network nodes 110 may include different numbers of antenna elements. For example, a UE 120 may include a single antenna element, two antenna elements, four antenna elements, eight antenna elements, or a different number of antenna elements. As another example, a network node 110 may include eight antenna elements, 24 antenna elements, 64 antenna elements, 128 antenna elements, or a different number of antenna elements. Generally, a larger number of antenna elements may provide increased control over parameters for beam generation relative to a smaller number of antenna elements, whereas a smaller number of antenna elements may be less complex to implement and may use less power than a larger number of antenna elements. Multiple antenna elements may support multiple-layer transmission, in which a first layer of a communication (which may include a first data stream) and a second layer of a communication (which may include a second data stream) are transmitted using the same time and frequency resources with spatial multiplexing.

In some aspects, the controller/processor 280 may be a component of a processing system. A processing system may generally be a system or a series of machines or components that receives inputs and processes the inputs to produce a set of outputs (which may be passed to other systems or components of, for example, the UE 120). For example, a processing system of the UE 120 may be a system that includes the various other components or subcomponents of the UE 120.

The processing system of the UE 120 may interface with one or more other components of the UE 120, may process information received from one or more other components (such as inputs or signals), or may output information to one or more other components. For example, a chip or modem of the UE 120 may include a processing system, a first interface to receive or obtain information, and a second interface to output, transmit, or provide information. In some examples, the first interface may be an interface between the processing system of the chip or modem and a receiver, such that the UE 120 may receive information or signal inputs, and the information may be passed to the processing system. In some examples, the second interface may be an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit, or provide information.

In some aspects, the controller/processor 240 may be a component of a processing system. A processing system may generally be a system or a series of machines or components that receives inputs and processes the inputs to produce a set of outputs (which may be passed to other systems or components of, for example, the network node 110). For example, a processing system of the network node 110 may be a system that includes the various other components or subcomponents of the network node 110.

The processing system of the network node 110 may interface with one or more other components of the network node 110, may process information received from one or more other components (such as inputs or signals), or may output information to one or more other components. For example, a chip or modem of the network node 110 may include a processing system, a first interface to receive or obtain information, and a second interface to output, transmit, or provide information. In some examples, the first interface may be an interface between the processing system of the chip or modem and a receiver, such that the network node 110 may receive information or signal inputs, and the information may be passed to the processing system. In some examples, the second interface may be an interface between the processing system of the chip or modem and a transmitter, such that the network node 110 May transmit information output from the chip or modem. A person having ordinary skill in the art will readily recognize that the second interface also may obtain or receive information or signal inputs, and the first interface also may output, transmit, or provide information.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

Figure 3:
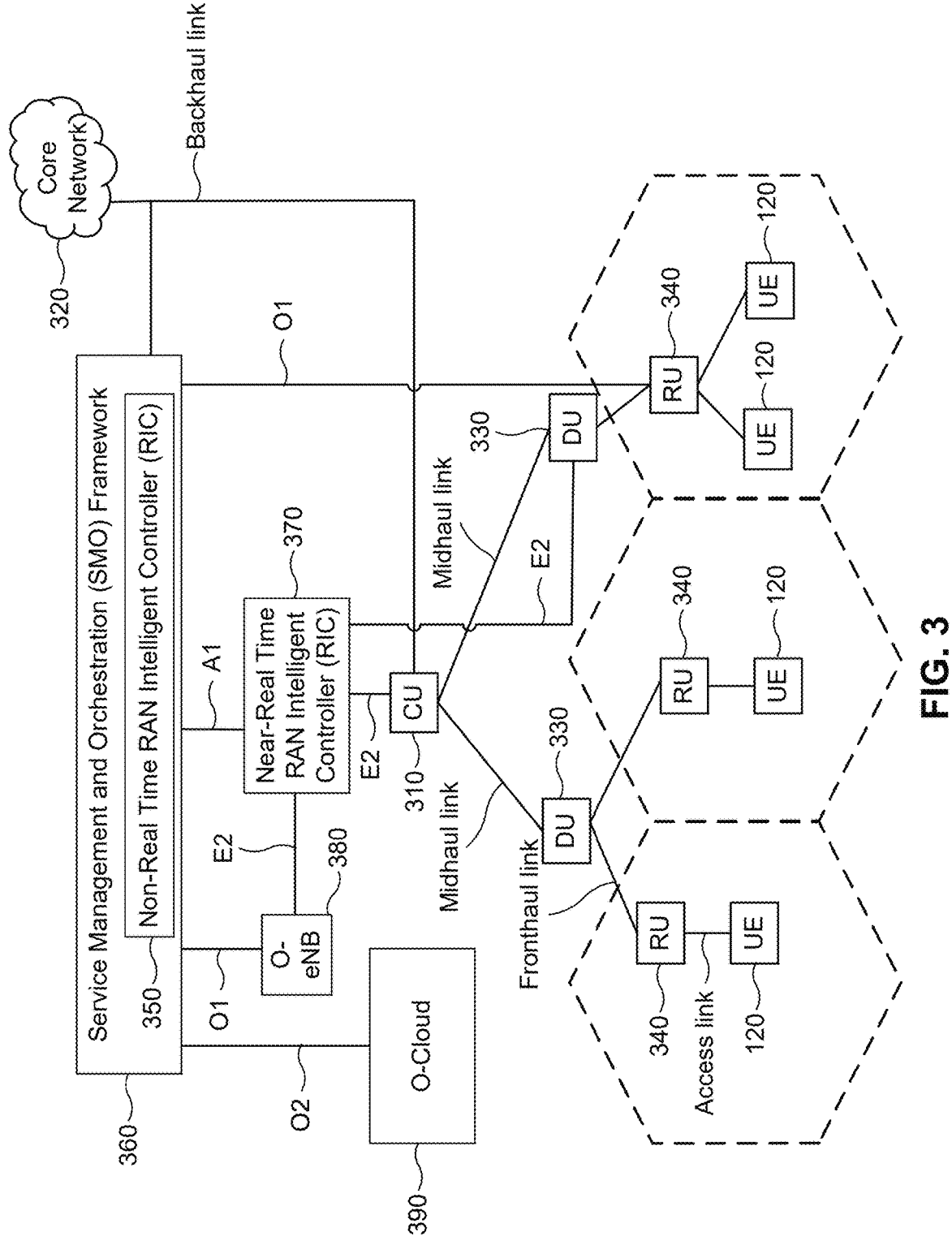
FIG. 3 is a diagram illustrating an example disaggregated base station architecture in accordance with the present disclosure.

FIG. 3 is a diagram illustrating an example disaggregated base station architecture 300 in accordance with the present disclosure. One or more components of the example disaggregated base station architecture 300 may be, may include, or may be included in one or more network nodes (such one or more network nodes 110). The disaggregated base station architecture 300 may include a CU 310 that can communicate directly with a core network 320 via a backhaul link, or that can communicate indirectly with the core network 320 via one or more disaggregated control units, such as a Non-RT RIC 350 associated with a Service Management and Orchestration (SMO) Framework 360 and/or a Near-RT RIC 370 (for example, via an E2 link). The CU 310 may communicate with one or more DUs 330 via respective midhaul links, such as via F1 interfaces. Each of the DUs 330 may communicate with one or more RUs 340 via respective fronthaul links. Each of the RUs 340 may communicate with one or more UEs 120 via respective RF access links. In some deployments, a UE 120 may be simultaneously served by multiple RUs 340.

Each of the components of the disaggregated base station architecture 300, including the CUS 310, the DUs 330, the RUs 340, the Near-RT RICs 370, the Non-RT RICs 350, and the SMO Framework 360, may include one or more interfaces or may be coupled with one or more interfaces for receiving or transmitting signals, such as data or information, via a wired or wireless transmission medium.

In some aspects, the CU 310 may be logically split into one or more CU user plane (CU-UP) units and one or more CU control plane (CU-CP) units. A CU-UP unit may communicate bidirectionally with a CU-CP unit via an interface, such as the E1 interface when implemented in an O-RAN configuration. The CU 310 may be deployed to communicate with one or more DUs 330, as necessary, for network control and signaling. Each DU 330 may correspond to a logical unit that includes one or more base station functions to control the operation of one or more RUs 340. For example, a DU 330 may host various layers, such as an RLC layer, a MAC layer, or one or more PHY layers, such as one or more high PHY layers or one or more low PHY layers. Each layer (which also may be referred to as a module) may be implemented with an interface for communicating signals with other layers (and modules) hosted by the DU 330, or for communicating signals with the control functions hosted by the CU 310. Each RU 340 may implement lower layer functionality. In some aspects, real-time and non-real-time aspects of control and user plane communication with the RU(s) 340 may be controlled by the corresponding DU 330.

The SMO Framework 360 may support RAN deployment and provisioning of non-virtualized and virtualized network elements. For non-virtualized network elements, the SMO Framework 360 may support the deployment of dedicated physical resources for RAN coverage requirements, which may be managed via an operations and maintenance interface, such as an O1 interface. For virtualized network elements, the SMO Framework 360 may interact with a cloud computing platform (such as an open cloud (O-Cloud) platform 390) to perform network element life cycle management (such as to instantiate virtualized network elements) via a cloud computing platform interface, such as an O2 interface. A virtualized network element may include, but is not limited to, a CU 310, a DU 330, an RU 340, a non-RT RIC 350, and/or a Near-RT RIC 370. In some aspects, the SMO Framework 360 may communicate with a hardware aspect of a 4G RAN, a 5G NR RAN, and/or a 6G RAN, such as an open eNB (O-eNB) 380, via an O1 interface. Additionally or alternatively, the SMO Framework 360 may communicate directly with each of one or more RUs 340 via a respective O1 interface. In some deployments, this configuration can enable each DU 330 and the CU 310 to be implemented in a cloud-based RAN architecture, such as a vRAN architecture.

The Non-RT RIC 350 may include or may implement a logical function that enables non-real-time control and optimization of RAN elements and resources, AI/ML workflows including model training and updates, and/or policy-based guidance of applications and/or features in the Near-RT RIC 370. The Non-RT RIC 350 may be coupled to or may communicate with (such as via an A1 interface) the Near-RT RIC 370. The Near-RT RIC 370 may include or may implement a logical function that enables near-real-time control and optimization of RAN elements and resources via data collection and actions via an interface (such as via an E2 interface) connecting one or more CUs 310, one or more DUs 330, and/or an O-eNB with the Near-RT RIC 370.

In some aspects, to generate AI/ML models to be deployed in the Near-RT RIC 370, the Non-RT RIC 350 may receive parameters or external enrichment information from external servers. Such information may be utilized by the Near-RT RIC 370 and may be received at the SMO Framework 360 or the Non-RT RIC 350 from non-network data sources or from network functions. In some examples, the Non-RT RIC 350 or the Near-RT RIC 370 may tune RAN behavior or performance. For example, the Non-RT RIC 350 may monitor long-term trends and patterns for performance and may employ AI/ML models to perform corrective actions via the SMO Framework 360 (such as reconfiguration via an O1 interface) or via creation of RAN management policies (such as A1 interface policies).

The network node 110, the controller/processor 240 of the network node 110, the UE 120, the controller/processor 280 of the UE 120, the CU 310, the DU 330, the RU 340, or any other component(s) of FIG. 1, 2, or 3 may implement one or more techniques or perform one or more operations associated with PPSINR signaling for communication adaptation, as described in more detail elsewhere herein. For example, the controller/processor 240 of the network node 110, the controller/processor 280 of the UE 120, any other component(s) (or combinations of components) of FIG. 2, the CU 310, the DU 330, or the RU 340 may perform or direct operations of, for example, process 600 of FIG. 6, process 700 of FIG. 7, or other processes as described herein (alone or in conjunction with one or more other processors). In some aspects, the first wireless communication device or the second wireless communication device described herein is the UE 120 or the network node 110, is included in the UE 120 or the network node 110, or includes one or more components of the UE 120 or the network node 110 shown in FIG. 2. The memory 242 may store data and program codes for the network node 110, the network node 110, the CU 310, the DU 330, or the RU 340. The memory 282 may store data and program codes for the UE 120. In some examples, the memory 242 or the memory 282 may include a non-transitory computer-readable medium storing a set of instructions (for example, code or program code) for wireless communication. The memory 242 may include one or more memories, such as a single memory or multiple different memories (of the same type or of different types). The memory 282 may include one or more memories, such as a single memory or multiple different memories (of the same type or of different types). For example, the set of instructions, when executed (for example, directly, or after compiling, converting, or interpreting) by one or more processors of the network node 110, the UE 120, the CU 310, the DU 330, or the RU 340, may cause the one or more processors to perform process 600 of FIG. 6, process 700 of FIG. 7, or other processes as described herein. In some examples, executing instructions may include running the instructions, converting the instructions, compiling the instructions, and/or interpreting the instructions, among other examples.

In some aspects, a first wireless communication device (e.g., a UE 120 or a network node 110) includes means for transmitting, to a second wireless communication device, a PPSINR message identifying a PPSINR value; and/or means for receiving, from the second wireless communication device and based on transmitting the PPSINR message identifying the PPSINR value, a communication in accordance with the PPSINR value. In some aspects, the means for the first wireless communication device to perform operations described herein may include, for example, one or more of communication manager 150, transmit processor 214, TX MIMO processor 216, modem 232, antenna 234, MIMO detector 236, receive processor 238, controller/processor 240, memory 242, or scheduler 246. In some aspects, the means for the first wireless communication device to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a second wireless communication device (e.g., a UE 120 or a network node 110) includes means for receiving, from a first wireless communication device, a PPSINR message identifying a PPSINR value; and/or means for transmitting, to the first wireless communication device and based on the reception of the PPSINR message identifying the PPSINR value, a communication in accordance with the PPSINR value. In some aspects, the means for the second wireless communication device to perform operations described herein may include, for example, one or more of communication manager 150, transmit processor 214, TX MIMO processor 216, modem 232, antenna 234, MIMO detector 236, receive processor 238, controller/processor 240, memory 242, or scheduler 246. In some aspects, the means for the second wireless communication device to perform operations described herein may include, for example, one or more of communication manager 140, antenna 252, modem 254, MIMO detector 256, receive processor 258, transmit processor 264, TX MIMO processor 266, controller/processor 280, or memory 282.

Figure 4:
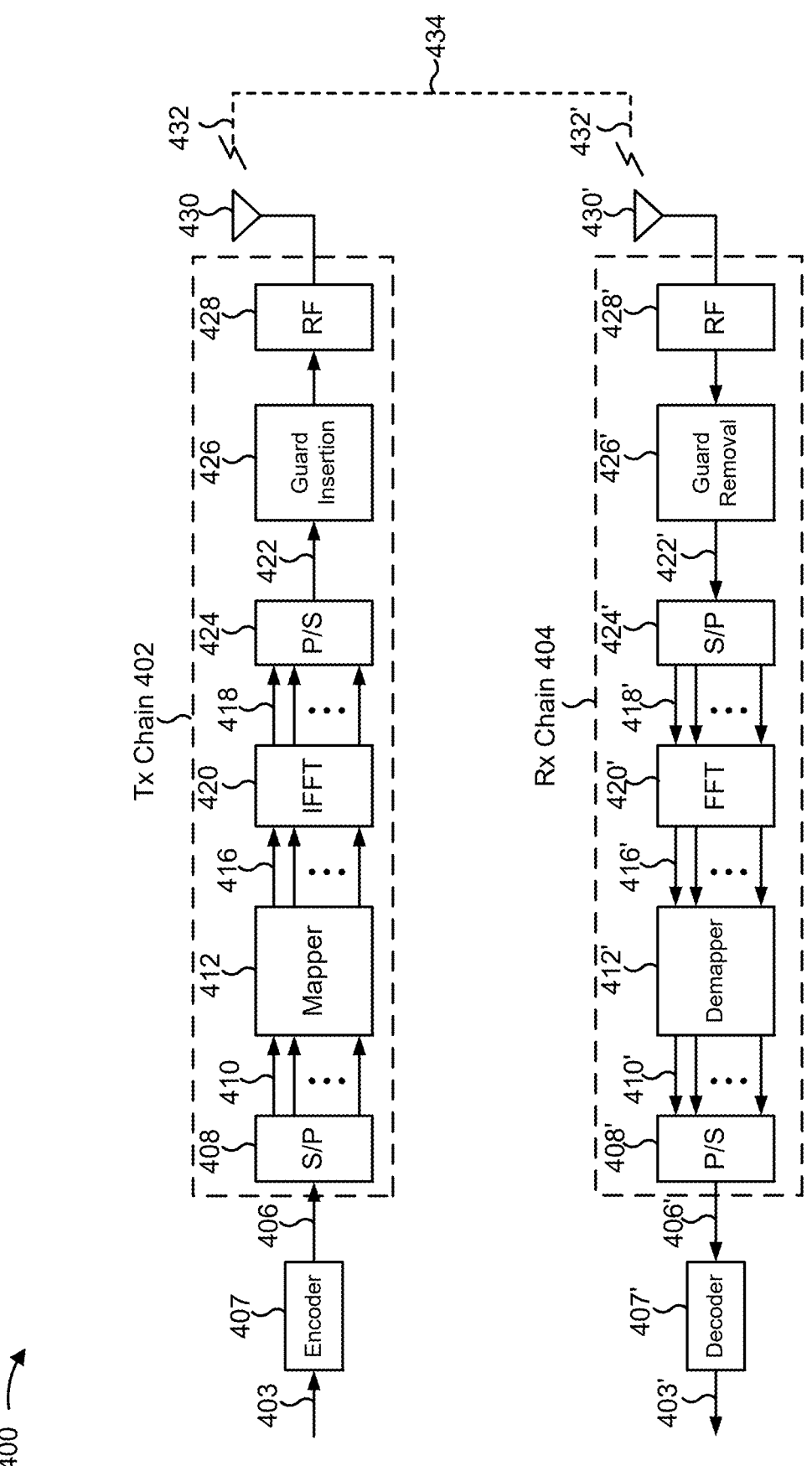
FIG. 4 is a diagram illustrating an example of a transmit (Tx) chain and a receive (Rx) chain of a UE, in accordance with the present disclosure.

FIG. 4 is a diagram illustrating an example 400 of a transmit (Tx) chain 402 and a receive (Rx) chain 404 of a UE 120, in accordance with the present disclosure. In some examples, the UE 120 may correspond to a wireless communication device described herein, such as first wireless communication device 510 or second wireless communication device 520 described with regard to FIG. 5. Although some examples are described herein in terms of a Tx chain or an Rx chain of a UE 120, a network node 110 may have a Tx chain or an Rx chain with one or more components described herein, and the network node 110 may correspond to a wireless communication device described herein.

In some examples, one or more components of Tx chain 402 may be implemented in transmit processor 264, TX MIMO processor 266, modem 254, and/or controller/processor 280, as described above in connection with FIG. 2. In some examples, Tx chain 402 may be implemented in UE 120 for transmitting data 406 (e.g., uplink data, an uplink reference signal, and/or uplink control information) to a network node 110 on an uplink channel.

An encoder 407 may alter a signal (e.g., a bitstream) 403 into data 406. Data 406 to be transmitted is provided from encoder 407 as input to a serial-to-parallel (S/P) converter 408. In some examples, S/P converter 408 may split the transmission data into N parallel data streams 410.

The N parallel data streams 410 may then be provided as input to a mapper 412. Mapper 412 may map the N parallel data streams 410 onto N constellation points. The mapping may be done using a modulation constellation, such as binary phase-shift keying (BPSK), quadrature phase-shift keying (QPSK), 8 phase-shift keying (8PSK), quadrature amplitude modulation (QAM), etc. Thus, mapper 412 may output N parallel symbol streams 416, each symbol stream 416 corresponding to one of N orthogonal subcarriers of an inverse fast Fourier transform (IFFT) component 420. These N parallel symbol streams 416 are represented in the frequency domain and may be converted into N parallel time domain sample streams 418 by IFFT component 420.

In some examples, N parallel modulations in the frequency domain correspond to N modulation symbols in the frequency domain, which are equal to N mapping and N-point IFFT in the frequency domain, which are equal to one (useful) OFDM symbol in the time domain, which are equal to N samples in the time domain. One OFDM symbol in the time domain, Ns, is equal to Ncp (the number of guard samples per OFDM symbol)+N (the number of useful samples per OFDM symbol).

The N parallel time domain sample streams 418 may be converted into an OFDM/OFDMA symbol stream 422 by a parallel-to-serial (P/S) converter 424. A guard insertion component 426 may insert a guard interval between successive OFDM/OFDMA symbols in the OFDM/OFDMA symbol stream 422. The output of guard insertion component 426 may then be upconverted to a desired transmit frequency band by a radio frequency (RF) front end 428. An antenna 430 may then transmit the resulting signal 432.

In some examples, Rx chain 404 may utilize OFDM/OFDMA. In some examples, one or more components of Rx chain 404 may be implemented in receive processor 258, MIMO detector 256, modem 254, and/or controller/processor 280, as described above in connection with FIG. 2. In some examples, Rx chain 404 may be implemented in UE 120 for receiving data 406 (e.g., downlink data, a downlink reference signal, and/or downlink control information) from a network node 110 on a downlink channel.

A transmitted signal 432 is shown traveling over a wireless channel 434 from Tx chain 402 to Rx chain 404. When a signal 432' is received by an antenna 430', the received signal 432' may be downconverted to a baseband signal by an RF front end 428'. A guard removal component 426' may then remove the guard interval that was inserted between OFDM/OFDMA symbols by guard insertion component 426.

The output of guard removal component 426' may be provided to an S/P converter 424'. The output may include an OFDM/OFDMA symbol stream 422', and S/P converter 424' may divide the OFDM/OFDMA symbol stream 422' into N parallel time-domain symbol streams 418', each of which corresponds to one of the N orthogonal subcarriers. A fast Fourier transform (FFT) component 420' may convert the N parallel time-domain symbol streams 418' into the frequency domain and output N parallel frequency-domain symbol streams 416'.

A demapper 412' may perform the inverse of the symbol mapping operation that was performed by mapper 412, thereby outputting N parallel data streams 410'. A P/S converter 408' may combine the N parallel data streams 410' into a single data stream 406'. Ideally, data stream 406' corresponds to data 406 that was provided as input to Tx chain 402. Data stream 406' may be decoded into a decoded data stream 403' by decoder 407'.

The number and arrangement of components shown in FIG. 4 are provided as an example. In practice, there may be additional components, fewer components, different components, or differently arranged components than those shown in FIG. 4. Furthermore, two or more components shown in FIG. 4 may be implemented within a single component, or a single component shown in FIG. 4 may be implemented as multiple, distributed components. Additionally, or alternatively, a set of components (e.g., one or more components) shown in FIG. 4 may perform one or more functions described as being performed by another set of components shown in FIG. 4.

As transmission frequency increases, some wireless communication devices may experience a droop scenario in which an output power decreases as signal frequency increases. Droop occurs in power amplifiers (PAs) of wireless communication devices as the wireless communication devices use higher and higher frequency bands. For example, as a wireless communication device transitions from a first frequency band to a second frequency band that is higher than the first frequency band, a power amplifier of the wireless communication device may experience a reduction in amplification efficiency and a corresponding reduction in output power between the first frequency band and the second frequency band.

Higher frequency bands may provide wireless communication devices with bandwidth for achieving greater throughput than is achieved at lower frequency bands. However, higher levels of droop at higher frequencies may result in higher error vector magnitude (EVM) values on a transmitted signal. EVM may correspond to a measurement of a difference between an ideal transmitted signal and a received signal after demodulation and may represent a differential between an observed modulation constellation point and an ideal signal constellation point. By reducing EVM, a wireless communication device may achieve a higher signal quality (e.g., less distortion), which may improve throughput. Pre-equalization may include a set of techniques to compensate for frequency-dependent distortions that occur in a signal path, such as linear equalization, frequency domain equalization, non-linear pre-distortion, or waveform shaping, among other examples. Such techniques may use a channel response value or a droop value. However, it may be desirable to further reduce EVM values.

Various aspects relate generally to post-processing signal-to-interference-plus-noise ratio (PPSINR) signaling for channel adaptation. For example, a first wireless communication device may transmit information identifying a PPSINR value relating to processing performed on an input signal to achieve a positive gain in SINR, such as equalization, time-domain summation, spherical combining, or other techniques. The second wireless communication device may use the information identifying the PPSINR value to perform pre-equalization, such as equalizing a channel response, cancelling a channel response, or flattening the channeling response, among other examples. In some aspects, the first wireless communication device may compress a PPSINR message conveying the PPSINR value to enable reporting without excessive overhead. In some aspects, a first wireless communication device and a second wireless communication device may exchange one or more signaling messages to configure PPSINR reporting to enable pre-equalization using the PPSINR value.

Particular aspects of the subject matter described in this disclosure can be implemented to realize one or more of the following potential advantages. In some examples, by reporting a PPSINR value, the described techniques can be used to perform pre-equalization on a channel to reduce EVM and improve throughput. In some examples, by applying a compression technique on a PPSINR message that conveys the PPSINR value, the described techniques can be used to signal the PPSINR value without excess overhead.

Figure 5:
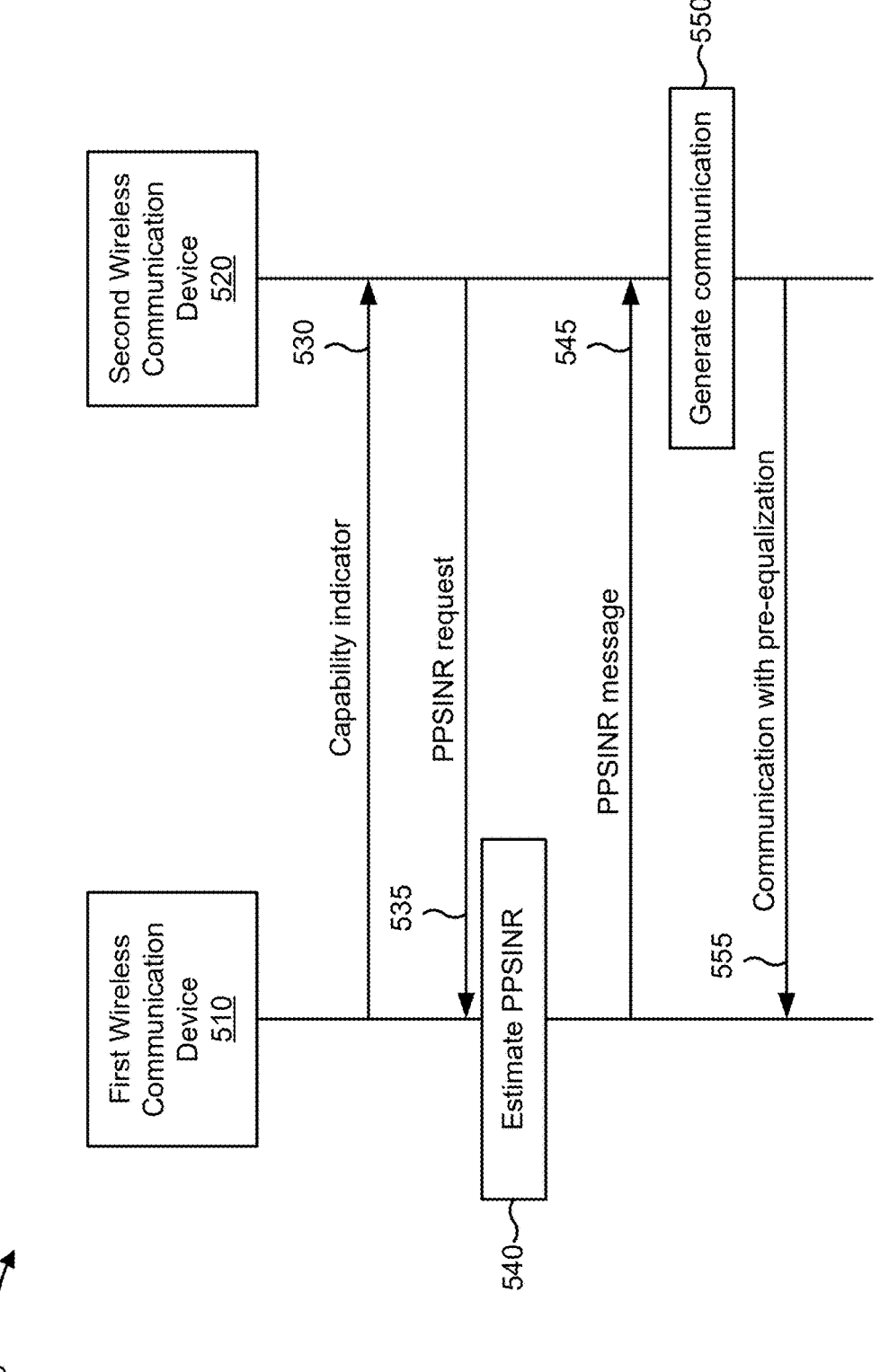
FIG. 5 is a diagram illustrating an example associated with post-processing signal-to-interference-plus-noise ratio signaling, in accordance with the present disclosure.

FIG. 5 is a diagram illustrating an example 500 associated with PPSINR signaling for communication adaptation, in accordance with the present disclosure. As shown in FIG. 5, example 500 includes communication between a first wireless communication device 510 and a second wireless communication device 520. In some aspects, such as when communication adaptation is performed on an access link, the first wireless communication device 510 may correspond to a UE 120 and the second wireless communication device 520 may correspond to a network node 110. In some aspects, such as when communication adaptation is performed on a backhaul link (e.g., in an integrated access and backhauling (IAB) deployment), the first wireless communication device 510 may correspond to a first network node 110 (e.g., a child node) and the second wireless communication device 520 may correspond to a second network node (e.g., a parent node).

As further shown in FIG. 5, and by reference number 530, the first wireless communication device 510 may transmit a capability indicator. For example, the first wireless communication device 510 may transmit a UE capability indicator or a network node capability indicator to identify a capability of the first wireless communication device 510. In some aspects, the first wireless communication device 510 may transmit the capability indicator when in a particular connection state. For example, at connection establishment, a UE-type of the first wireless communication device 510 may transmit a UE capability indicator identifying a capability for determining and reporting a PPSINR value. In this case, the UE-type of the first wireless communication device 510 may receive a request and transmit a PPSINR message, as described in more detail herein, in a connected mode.

In some aspects, the first wireless communication device 510 may identify one or more parameters associated with PPSINR reporting using a capability indicator. For example, the first wireless communication device 510 may transmit information identifying a granularity with which the first wireless communication device 510 can measure a PPSINR value. Additionally, or alternatively, the first wireless communication device 510 may transmit information identifying a time window that the first wireless communication device 510 can use to measure the PPSINR value. In some aspects, the first wireless communication device 510 may transmit an indication of a characteristic of a PPSINR value. For example, the first wireless communication device 510 may indicate, using the capability indicator, whether PPSINR is interference dominant for the first wireless communication device 510 (and, if so, on which frequencies the PPSINR is interference dominant).

Additionally, or alternatively, the first wireless communication device 510 may transmit an indication of a receiver droop response. For example, when a dominant noise source is associated with a transmitter, a droop response can be subtracted from a measurement of a transmit droop channel receiver droop to determine a channel response (e.g., a transmit droop channel response). In such a scenario, and when transmit droop is known by the second wireless communication device 520, pre-equalization complexity may be reduced by pre-equalizing with respect to the transmit droop and the receiver droop.

As further shown in FIG. 5, and by reference number 535, the first wireless communication device 510 may receive a PPSINR request. For example, when the second wireless communication device 520 is to perform communication adaptation, the second wireless communication device 520 may transmit the PPSINR request in order to request that the first wireless communication device 510 provide PPSINR information. In some aspects, the second wireless communication device 520 may transmit the PPSINR request based on receiving the capability indicator. For example, based on the capability indicator identifying a capability for reporting PPSINR information, the second wireless communication device 520 may transmit the PPSINR request. Additionally, or alternatively, the first wireless communication device 510 may transmit PPSINR information periodically (e.g., without receiving a request). For example, the second wireless communication device 520 may configure the first wireless communication device 510 with periodic resources for transmitting PPSINR information.

In some aspects, the second wireless communication device 520 may indicate one or more parameters for determining the PPSINR when transmitting the PPSINR request (or configuring periodic PPSINR determination). For example, the second wireless communication device 520 may indicate that the PPSINR is to be determined on a per frequency group basis and/or may indicate a size of a frequency group for which the PPSINR is to be determined. Additionally, or alternatively, the second wireless communication device 520 may indicate a time window (e.g., a duration) for which the PPSINR is to be determined (e.g., a longer time window may correspond to a longer delay in PPSINR reporting but a reduction in an effect of noise variation on the PPSINR).

In some aspects, the second wireless communication device 520 may indicate one or more parameters relating to compression, such as a compression technique for PPSINR reporting. For example, the second wireless communication device 520 may indicate that the first wireless communication device 510 is to provide an uncompressed PPSINR report (e.g., a full PPSINR report identifying a set of PPSINR values on a per resource element (RE) or per RE group (REG) basis). Additionally, or alternatively, the second wireless communication device 520 may indicate that the first wireless communication device 510 is to provide a time domain response that best represents the PPSINR value. In this case, the second wireless communication device 520 may indicate one or more threshold criteria for determining which time domain response best represents the PPSINR value, a number of taps for the time domain response, or a number of bits for the time domain response, among other examples. Additionally, or alternatively, the second wireless communication device 520 may indicate a request for a linear representation (or other type of function representation) of the PPSINR value. Accordingly, the first wireless communication device 510 and the second wireless communication device 520 may achieve a higher degree of compression for the PPSINR report than other representations of the PPSINR value.

As further shown in FIG. 5, and by reference number 540, the first wireless communication device 510 may estimate or determine a PPSINR value. For example, the first wireless communication device 510 may measure a PPSINR of one or more transmissions across a configured time window and determine a PPSINR value that represents the PPSINR. In this case, the PPSINR value may be a linear representation of the PPSINR across the configured time window, a time domain response representing the PPSINR across the configured time window, or a plurality of values identifying the PPSINR at a plurality of instances across the configured time window, among other examples.

As further shown in FIG. 5, and by reference number 545, the first wireless communication device 510 may transmit a PPSINR message. For example, based on receiving the PPSINR request and/or determining the PPSINR value, the first wireless communication device 510 may transmit the PPSINR message to report the PPSINR value or information associated therewith. In some aspects, the first wireless communication device 510 may report one or more parameters associated with the PPSINR value. For example, the first wireless communication device 510 may indicate whether the PPSINR value is better than a previously measured PPSINR value (e.g., in a previous time window). Additionally, or alternatively, the first wireless communication device 510 may indicate whether the PPSINR value is being biased by interference (e.g., which the first wireless communication device 510 may determine based on a noise variance across a set of frequencies during the time window).

As further shown in FIG. 5, and by reference numbers 550 and 555, the second wireless communication device 520 may generate a communication and transmit the communication with pre-equalization. For example, the second wireless communication device 520 may configure pre-equalization based on the PPSINR value and may pre-equalize a communication in a transmit chain of the second wireless communication device 520. In some aspects, the second wireless communication device 520 may apply pre-equalization to flatten the PPSINR value and/or an EVM value associated with the PPSINR value. For example, based on information identifying the PPSINR value, the second wireless communication device 520 may pre-equalize a communication to flatten the PPSINR of the communication, thereby achieving improved communication performance, such as by improving communication throughput, relative to channel flattening. In some aspects, performing pre-equalization may include one or more techniques. For example, the second wireless communication device 520 may perform equalization, time domain summation, spherical combining, or another processing technique to adjust a communication. In this case, the second wireless communication device 520 applies a positive gain to an SINR value to flatten the PPSINR and/or an EVM value associated with a communication. Additionally, or alternatively, the second wireless communication device 520 may cancel or flatten a channel response to pre-equalize a communication.

In some aspects, the second wireless communication device 520 may perform a plurality of pre-equalization techniques, such as flattening the PPSINR value and flattening a channel. Based on pre-equalizing transmissions on a link, the second wireless communication device 520 may optimize throughput on the link, such as throughput for an uplink shared channel transmission (e.g., a physical uplink shared channel (PUSCH) transmission or a physical downlink shared channel (PDSCH) transmission) among other examples.

As indicated above, FIG. 5 is provided as an example. Other examples may differ from what is described with respect to FIG. 5.

Figure 6:
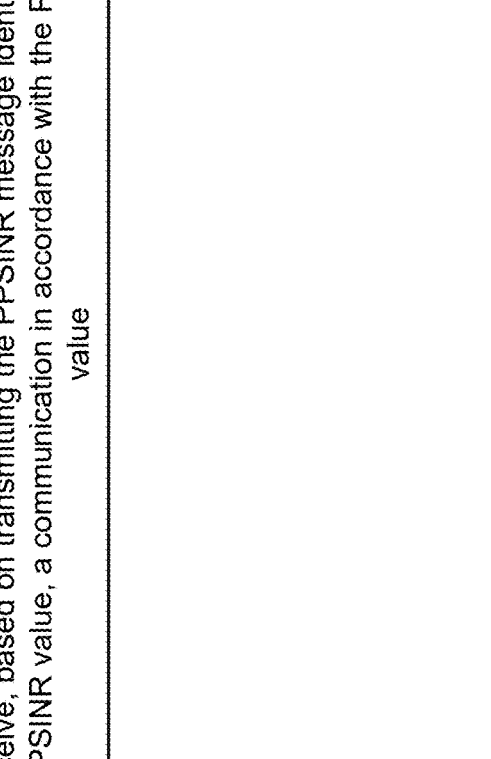
FIG. 6 is a diagram illustrating an example process performed, for example, at a first wireless communication device or an apparatus of a first wireless communication device, in accordance with the present disclosure.

FIG. 6 is a diagram illustrating an example process 600 performed, for example, at a first wireless communication device or an apparatus of a first wireless communication device, in accordance with the present disclosure. Example process 600 is an example where the apparatus or the first wireless communication device (e.g., first wireless communication device 510, a UE 120, or a network node 110) performs operations associated with PPSINR signaling for communication adaptation.

As shown in FIG. 6, in some aspects, process 600 may include transmitting, to a second wireless communication device, a PPSINR message identifying a PPSINR value (block 610). For example, the first wireless communication device (e.g., using transmission component 804 and/or communication manager 806, depicted in FIG. 8) may transmit, to a second wireless communication device, a PPSINR message identifying a PPSINR value, as described above.

As further shown in FIG. 6, in some aspects, process 600 may include receiving, from the second wireless communication device and based on transmitting the PPSINR message identifying the PPSINR value, a communication in accordance with the PPSINR value (block 620). For example, the first wireless communication device (e.g., using reception component 802 and/or communication manager 806, depicted in FIG. 8) may receive, from the second wireless communication device and based on transmitting the PPSINR message identifying the PPSINR value, a communication in accordance with the PPSINR value, as described above.

Process 600 may include additional aspects, such as any single aspect or any combination of aspects described below and/or in connection with one or more other processes described elsewhere herein.

In a first aspect, the PPSINR message is a periodic message.

In a second aspect, alone or in combination with the first aspect, process 600 includes receiving, from a second wireless communication device, a request for identification of a PPSINR value, and transmitting the PPSINR message comprises transmitting the PPSINR message based on reception of the request.

In a third aspect, alone or in combination with one or more of the first and second aspects, process 600 includes transmitting, based on a connection establishment, a UE capability indicator identifying a capability associated with PPSINR signaling, and the reception of the request for identification of the PPSINR value is based on the transmission of the UE capability indicator.

In a fourth aspect, alone or in combination with one or more of the first through third aspects, the UE capability indicator includes information identifying at least one of a granularity associated with the PPSINR value, a time characteristic associated with the PPSINR value, an interference characteristic associated with the PPSINR value, a frequency characteristic associated with the PPSINR value, or a droop characteristic associated with the PPSINR value.

In a fifth aspect, alone or in combination with one or more of the first through fourth aspects, the request includes information identifying at least one of a frequency group size parameter, a time parameter, or a compression type parameter.

In a sixth aspect, alone or in combination with one or more of the first through fifth aspects, the compression type parameter indicates at least one of a per resource element PPSINR value, a per resource element group PPSINR value, a time domain PPSINR value, or a linear representation PPSINR value.

In a seventh aspect, alone or in combination with one or more of the first through sixth aspects, the communication is pre-equalized at a transmitter in accordance with the PPSINR value.

In an eighth aspect, alone or in combination with one or more of the first through seventh aspects, the PPSINR message is transmitted based on the PPSINR value being different from a previous PPSINR value.

In a ninth aspect, alone or in combination with one or more of the first through eighth aspects, the PPSINR message includes an interference indication.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
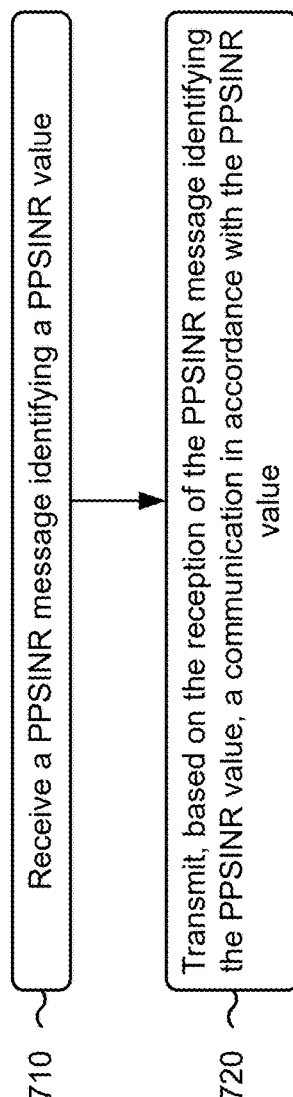
FIG. 7 is a diagram illustrating an example process performed, for example, at a second wireless communication device or an apparatus of a second wireless communication device, in accordance with the present disclosure.

FIG. 7 is a diagram illustrating an example process 700 performed, for example, at a second wireless communication device or an apparatus of a second wireless communication device, in accordance with the present disclosure. Example process 700 is an example where the apparatus or the second wireless communication device (e.g., second wireless communication device 520, a UE 120, or a network node 110) performs operations associated with techniques for PPSINR signaling for communication adaptation.

As shown in FIG. 7, in some aspects, process 700 may include receiving, from a first wireless communication device, a PPSINR message identifying a PPSINR value (block 710). For example, the second wireless communication device (e.g., using reception component 902 and/or communication manager 906, depicted in FIG. 9) may receive, from a first wireless communication device, a PPSINR message identifying a PPSINR value, as described above.

As further shown in FIG. 7, in some aspects, process 700 may include transmitting, to the first wireless communication device and based on the reception of the PPSINR message identifying the PPSINR value, a communication in accordance with the PPSINR value (block 720). For example, the second wireless communication device (e.g., using transmission component 904 and/or communication manager 906, depicted in FIG. 9) may transmit, to the first wireless communication device and based on the reception of the PPSINR message identifying the PPSINR value, a communication in accordance with the PPSINR value, as described above.

Process 700 may include additional aspects, such as any single aspect or any combination of aspects described below and/or in connection with one or more other processes described elsewhere herein.

In a first aspect, the PPSINR message is a periodic message.

In a second aspect, alone or in combination with the first aspect, process 700 includes transmitting, to the first wireless communication device, a request for identification of a PPSINR value, and receiving the PPSINR message comprises receiving the PPSINR message based on transmission of the request.

In a third aspect, alone or in combination with one or more of the first and second aspects, process 700 includes receiving, based on a connection establishment, a UE capability indicator identifying a capability associated with PPSINR signaling, and the transmission of the request for identification of the PPSINR value is based on the reception of the UE capability indicator.

In a fourth aspect, alone or in combination with one or more of the first through third aspects, the UE capability indicator includes information identifying at least one of a granularity associated with the PPSINR value, a time characteristic associated with the PPSINR value, an interference characteristic associated with the PPSINR value, a frequency characteristic associated with the PPSINR value, or a droop characteristic associated with the PPSINR value.

In a fifth aspect, alone or in combination with one or more of the first through fourth aspects, the request includes information identifying at least one of a frequency group size parameter, a time parameter, or a compression type parameter.

In a sixth aspect, alone or in combination with one or more of the first through fifth aspects, the compression type parameter indicates at least one of a per resource element PPSINR value, a per resource element group PPSINR value, a time domain PPSINR value, or a linear representation PPSINR value.

In a seventh aspect, alone or in combination with one or more of the first through sixth aspects, process 700 includes equalizing a channel response of the communication based on the PPSINR value.

In an eighth aspect, alone or in combination with one or more of the first through seventh aspects, process 700 includes applying a positive gain to an input signal to generate the communication in accordance with the PPSINR value.

In a ninth aspect, alone or in combination with one or more of the first through eighth aspects, the PPSINR message is received based on the PPSINR value being different from a previous PPSINR value.

In a tenth aspect, alone or in combination with one or more of the first through ninth aspects, the PPSINR message includes an interference indication.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram of an example apparatus 800 for wireless communication, in accordance with the present disclosure. The apparatus 800 may be a first wireless communication device, or a first wireless communication device may include the apparatus 800. In some aspects, the apparatus 800 includes a reception component 802, a transmission component 804, and/or a communication manager 806, which may be in communication with one another (for example, via one or more buses and/or one or more other components). In some aspects, the communication manager 806 is the communication managers 140 or 150 described in connection with FIG. 1. In some aspects, the apparatus 800 may correspond to a UE 120 or a network node 110. As shown, the apparatus 800 may communicate with another apparatus 808, such as a UE or a network node (such as a CU, a DU, an RU, or a base station), using the reception component 802 and the transmission component 804.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the first wireless communication device described in connection with FIG. 1 and FIG. 2. Additionally, or alternatively, one or more components shown in FIG. 8 may be implemented within one or more components described in connection with FIG. 1 and FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 802 may receive communications, such as reference signals, control information, data communications, or a combination thereof, from the apparatus 808. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, one or more modems, one or more demodulators, one or more MIMO detectors, one or more receive processors, one or more controllers/processors, one or more memories, or a combination thereof, of the first wireless communication device described in connection with FIG. 1 and FIG. 2.

The transmission component 804 may transmit communications, such as reference signals, control information, data communications, or a combination thereof, to the apparatus 808. In some aspects, one or more other components of the apparatus 800 may generate communications and may provide the generated communications to the transmission component 804 for transmission to the apparatus 808. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 808. In some aspects, the transmission component 804 may include one or more antennas, one or more modems, one or more modulators, one or more transmit MIMO processors, one or more transmit processors, one or more controllers/processors, one or more memories, or a combination thereof, of the first wireless communication device described in connection with FIG. 1 and FIG. 2. In some aspects, the transmission component 804 may be co-located with the reception component 802 in one or more transceivers.

The communication manager 806 may support operations of the reception component 802 and/or the transmission component 804. For example, the communication manager 806 may receive information associated with configuring reception of communications by the reception component 802 and/or transmission of communications by the transmission component 804. Additionally, or alternatively, the communication manager 806 may generate and/or provide control information to the reception component 802 and/or the transmission component 804 to control reception and/or transmission of communications.

The transmission component 804 may transmit, to a second wireless communication device, a PPSINR message identifying a PPSINR value. The reception component 802 may receive, from the second wireless communication device and based on transmitting the PPSINR message identifying the PPSINR value, a communication in accordance with the PPSINR value. The reception component 802 may receive, from a second wireless communication device, a request for identification of a PPSINR value. The transmission component 804 may transmit, based on a connection establishment, a UE capability indicator identifying a capability associated with PPSINR signaling, wherein the reception of the request for identification of the PPSINR value is based on the transmission of the UE capability indicator.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

FIG. 9 is a diagram of an example apparatus 900 for wireless communication, in accordance with the present disclosure. The apparatus 900 may be a second wireless communication device, or a second wireless communication device may include the apparatus 900. In some aspects, the apparatus 900 includes a reception component 902, a transmission component 904, and/or a communication manager 906, which may be in communication with one another (for example, via one or more buses and/or one or more other components). In some aspects, the communication manager 906 is the communication managers 140 or 150 described in connection with FIG. 1. In some aspects, the apparatus 900 may correspond to a UE 120 or a network node 110. As shown, the apparatus 900 may communicate with another apparatus 908, such as a UE or a network node (such as a CU, a DU, an RU, or a base station), using the reception component 902 and the transmission component 904.

In some aspects, the apparatus 900 may be configured to perform one or more operations described herein in connection with FIG. 5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the second wireless communication device described in connection with FIG. 1 and FIG. 2. Additionally, or alternatively, one or more components shown in FIG. 9 may be implemented within one or more components described in connection with FIG. 1 and FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 902 may receive communications, such as reference signals, control information, data communications, or a combination thereof, from the apparatus 908. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, one or more modems, one or more demodulators, one or more MIMO detectors, one or more receive processors, one or more controllers/processors, one or more memories, or a combination thereof, of the second wireless communication device described in connection with FIG. 1 and FIG. 2.

The transmission component 904 may transmit communications, such as reference signals, control information, data communications, or a combination thereof, to the apparatus 908. In some aspects, one or more other components of the apparatus 900 may generate communications and may provide the generated communications to the transmission component 904 for transmission to the apparatus 908. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 904 may include one or more antennas, one or more modems, one or more modulators, one or more transmit MIMO processors, one or more transmit processors, one or more controllers/processors, one or more memories, or a combination thereof, of the second wireless communication device described in connection with FIG. 1 and FIG. 2. In some aspects, the transmission component 904 may be co-located with the reception component 902 in one or more transceivers.

The communication manager 906 may support operations of the reception component 902 and/or the transmission component 904. For example, the communication manager 906 may receive information associated with configuring reception of communications by the reception component 902 and/or transmission of communications by the transmission component 904. Additionally, or alternatively, the communication manager 906 may generate and/or provide control information to the reception component 902 and/or the transmission component 904 to control reception and/or transmission of communications.

The reception component 902 may receive, from a first wireless communication device, a PPSINR message identifying a PPSINR value. The transmission component 904 may transmit, to the first wireless communication device and based on the reception of the PPSINR message identifying the PPSINR value, a communication in accordance with the PPSINR value. The transmission component 904 may transmit, to the first wireless communication device, a request for identification of a PPSINR value. The reception component 902 may receive, based on a connection establishment, a UE capability indicator identifying a capability associated with PPSINR signaling, wherein the transmission of the request for identification of the PPSINR value is based on the reception of the UE capability indicator. The communication manager 906 may equalize a channel response of the communication based on the PPSINR value. The communication manager 906 may apply a positive gain to an input signal to generate the communication in accordance with the PPSINR value.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a first wireless communication device, comprising: transmitting, to a second wireless communication device, a post-processing signal-to-interference-plus-noise ratio (PPSINR) message identifying a PPSINR value; and receiving, from the second wireless communication device and based on transmitting the PPSINR message identifying the PPSINR value, a communication in accordance with the PPSINR value.

Aspect 2: The method of Aspect 1, wherein the PPSINR message is a periodic message.

Aspect 3: The method of any of Aspects 1-2, further comprising: receiving, from a second wireless communication device, a request for identification of a PPSINR value; and wherein transmitting the PPSINR message comprises: transmitting the PPSINR message based on reception of the request.

Aspect 4: The method of Aspect 3, further comprising: transmitting, based on a connection establishment, a UE capability indicator identifying a capability associated with PPSINR signaling, and wherein the reception of the request for identification of the PPSINR value is based on the transmission of the UE capability indicator.

Aspect 5: The method of Aspect 4, wherein the UE capability indicator includes information identifying at least one of: a granularity associated with the PPSINR value, a time characteristic associated with the PPSINR value, an interference characteristic associated with the PPSINR value, a frequency characteristic associated with the PPSINR value, or a droop characteristic associated with the PPSINR value.

Aspect 6: The method of Aspect 3, wherein the request includes information identifying at least one of: a frequency group size parameter, a time parameter, or a compression type parameter.

Aspect 7: The method of Aspect 6, wherein the compression type parameter indicates at least one of: a per resource element PPSINR value, a per resource element group PPSINR value, a time domain PPSINR value, or a linear representation PPSINR value.

Aspect 8: The method of any of Aspects 1-7, wherein the communication is pre-equalized at a transmitter in accordance with the PPSINR value.

Aspect 9: The method of any of Aspects 1-8, wherein the PPSINR message is transmitted based on the PPSINR value being different from a previous PPSINR value.

Aspect 10: The method of any of Aspects 1-9, wherein the PPSINR message includes an interference indication.

Aspect 11: A method of wireless communication performed by a second wireless communication device, comprising: receiving, from a first wireless communication device, a post-processing signal-to-interference-plus-noise ratio (PPSINR) message identifying a PPSINR value; and transmitting, to the first wireless communication device and based on the reception of the PPSINR message identifying the PPSINR value, a communication in accordance with the PPSINR value.

Aspect 12: The method of Aspect 11, wherein the PPSINR message is a periodic message.

Aspect 13: The method of any of Aspects 11-12, further comprising: transmitting, to the first wireless communication device, a request for identification of a PPSINR value; and wherein receiving the PPSINR message comprises: receiving the PPSINR message based on transmission of the request.

Aspect 14: The method of Aspect 13, further comprising: receiving, based on a connection establishment, a UE capability indicator identifying a capability associated with PPSINR signaling, and wherein the transmission of the request for identification of the PPSINR value is based on the reception of the UE capability indicator.

Aspect 15: The method of Aspect 14, wherein the UE capability indicator includes information identifying at least one of: a granularity associated with the PPSINR value, a time characteristic associated with the PPSINR value, an interference characteristic associated with the PPSINR value, a frequency characteristic associated with the PPSINR value, or a droop characteristic associated with the PPSINR value.

Aspect 16: The method of Aspect 13, wherein the request includes information identifying at least one of: a frequency group size parameter, a time parameter, or a compression type parameter.

Aspect 17: The method of Aspect 16, wherein the compression type parameter indicates at least one of: a per resource element PPSINR value, a per resource element group PPSINR value, a time domain PPSINR value, or a linear representation PPSINR value.

Aspect 18: The method of any of Aspects 11-17, further comprising: equalizing a channel response of the communication based on the PPSINR value.

Aspect 19: The method of any of Aspects 11-18, further comprising: applying a positive gain to an input signal to generate the communication in accordance with the PPSINR value.

Aspect 20: The method of any of Aspects 11-19, wherein the PPSINR message is received based on the PPSINR value being different from a previous PPSINR value.

Aspect 21: The method of any of Aspects 11-20, wherein the PPSINR message includes an interference indication.

Aspect 22: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-21.

Aspect 23: An apparatus for wireless communication at a device, the apparatus comprising one or more memories and one or more processors coupled to the one or more memories, the one or more processors configured to cause the device to perform the method of one or more of Aspects 1-21.

Aspect 24: An apparatus for wireless communication, the apparatus comprising at least one means for performing the method of one or more of Aspects 1-21.

Aspect 25: A non-transitory computer-readable medium storing code for wireless communication, the code comprising instructions executable by one or more processors to perform the method of one or more of Aspects 1-21.

Aspect 26: A non-transitory computer-readable medium storing a set of instructions for wireless communication, the set of instructions comprising one or more instructions that, when executed by one or more processors of a device, cause the device to perform the method of one or more of Aspects 1-21.

Aspect 27: A device for wireless communication, the device comprising a processing system that includes one or more processors and one or more memories coupled with the one or more processors, the processing system configured to cause the device to perform the method of one or more of Aspects 1-21.

Aspect 28: An apparatus for wireless communication at a device, the apparatus comprising one or more memories and one or more processors coupled to the one or more memories, the one or more processors individually or collectively configured to cause the device to perform the method of one or more of Aspects 1-21.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on." As used herein, "satisfying a threshold" may, depending on the context, refer to a value being greater than the threshold, greater than or equal to the threshold, less than the threshold, less than or equal to the threshold, equal to the threshold, or not equal to the threshold, among other examples. As used herein, a phrase referring to "at least one of" a list of items refers to any combination of those items, including single members. As an example, "at least one of: a, b, or c" is intended to cover: a, b, c, a+b, a+c, b+c, and a+b+c.

Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A also may have B). Further, as used herein, the term "or" is intended to be inclusive when used in a series and may be used interchangeably with "and/or," unless explicitly stated otherwise (for example, if used in combination with "either" or "only one of").

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs (such as one or more modules of computer program instructions) encoded on a computer storage media for execution by, or to control the operation of, a data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the media described herein should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A first wireless communication device for wireless communication, comprising:
   one or more memories; and
   one or more processors, coupled to the one or more memories, configured to cause the first wireless communication device to:
      transmit, to a second wireless communication device, a post-processing signal-to-interference-plus-noise ratio (PPSINR) message identifying a PPSINR value; and
      receive, from the second wireless communication device and based on transmitting the PPSINR message identifying the PPSINR value, a communication in accordance with the PPSINR value.

2. The first wireless communication device of claim 1, wherein the PPSINR message is a periodic message.

3. The first wireless communication device of claim 1, wherein the one or more processors are further configured to cause the first wireless communication device to:
   receive, from a second wireless communication device, a request for identification of a PPSINR value; and
   wherein the one or more processors, to cause the first wireless communication device to transmit the PPSINR message, are configured to cause the first wireless communication device to:
      transmit the PPSINR message based on reception of the request.

4. The first wireless communication device of claim 3, wherein the one or more processors are further configured to cause the first wireless communication device to:
   transmit, based on a connection establishment, a UE capability indicator identifying a capability associated with PPSINR signaling, and
   wherein the reception of the request for identification of the PPSINR value is based on the transmission of the UE capability indicator.

5. The first wireless communication device of claim 4, wherein the UE capability indicator includes information identifying at least one of:
   a granularity associated with the PPSINR value,
   a time characteristic associated with the PPSINR value,
   an interference characteristic associated with the PPSINR value, a frequency characteristic associated with the PPSINR value, or
   a droop characteristic associated with the PPSINR value.

6. The first wireless communication device of claim 3, wherein the request includes information identifying at least one of:
   a frequency group size parameter,
   a time parameter, or
   a compression type parameter.

7. The first wireless communication device of claim 6, wherein the compression type parameter indicates at least one of:
   a per resource element PPSINR value,
   a per resource element group PPSINR value,
   a time domain PPSINR value, or
   a linear representation PPSINR value.

8. The first wireless communication device of claim 1, wherein the communication is pre-equalized at a transmitter in accordance with the PPSINR value.

9. The first wireless communication device of claim 1, wherein the PPSINR message is transmitted based on the PPSINR value being different from a previous PPSINR value.

10. The first wireless communication device of claim 1, wherein the PPSINR message includes an interference indication.

11. A second wireless communication device for wireless communication, comprising:
   one or more memories; and
   one or more processors, coupled to the one or more memories, configured to cause the second wireless communication device to:
      receive, from a first wireless communication device, a post-processing signal-to-interference-plus-noise ratio (PPSINR) message identifying a PPSINR value; and
      transmit, to the first wireless communication device and based on the reception of the PPSINR message identifying the PPSINR value, a communication in accordance with the PPSINR value.

12. The second wireless communication device of claim 11, wherein the PPSINR message is a periodic message.

13. The second wireless communication device of claim 12, wherein the one or more processors are further configured to cause the second wireless communication device to:
   equalize a channel response of the communication based on the PPSINR value.

14. The second wireless communication device of claim 12, wherein the one or more processors are further configured to cause the second wireless communication device to:
   apply a positive gain to an input signal to generate the communication in accordance with the PPSINR value.

15. The second wireless communication device of claim 11, wherein the one or more processors are further configured to cause the second wireless communication device to:
   transmit, to the first wireless communication device, a request for identification of a PPSINR value; and
   wherein the one or more processors, to cause the second wireless communication device to receive the PPSINR message, are configured to cause the second wireless communication device to:
      receive the PPSINR message based on transmission of the request.

16. The second wireless communication device of claim 15, wherein the one or more processors are further configured to cause the second wireless communication device to:

receive, based on a connection establishment, a UE capability indicator identifying a capability associated with PPSINR signaling, and wherein the transmission of the request for identification of the PPSINR value is based on the reception of the UE capability indicator.

17. The second wireless communication device of claim 16, wherein the UE capability indicator includes information identifying at least one of:

a granularity associated with the PPSINR value, a time characteristic associated with the PPSINR value, an interference characteristic associated with the PPSINR value, a frequency characteristic associated with the PPSINR value, or a droop characteristic associated with the PPSINR value.

18. The second wireless communication device of claim 15, wherein the request includes information identifying at least one of:

a frequency group size parameter, a time parameter, or a compression type parameter.

19. The second wireless communication device of claim 18, wherein the compression type parameter indicates at least one of:

a per resource element PPSINR value, a per resource element group PPSINR value, a time domain PPSINR value, or a linear representation PPSINR value.

20. A method of wireless communication performed by a first wireless communication device, comprising:

transmitting, to a second wireless communication device, a post-processing signal-to-interference-plus-noise ratio (PPSINR) message identifying a PPSINR value; and receiving, from the second wireless communication device and based on transmitting the PPSINR message identifying the PPSINR value, a communication in accordance with the PPSINR value.

* * * * *